United States Patent
Hashimoto et al.

(10) Patent No.: US 11,035,714 B2
(45) Date of Patent: Jun. 15, 2021

(54) FLOW METER

(71) Applicant: Keyence Corporation, Osaka (JP)

(72) Inventors: Yohei Hashimoto, Osaka (JP); Satoru Tomoshi, Osaka (JP); Hiroki Matsui, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 325 days.

(21) Appl. No.: 16/002,446

(22) Filed: Jun. 7, 2018

(65) Prior Publication Data

US 2019/0011303 A1 Jan. 10, 2019

(30) Foreign Application Priority Data

Jul. 4, 2017 (JP) .............................. JP2017-131551

(51) Int. Cl.
G01F 15/06 (2006.01)
G01F 15/00 (2006.01)
G01F 1/66 (2006.01)

(52) U.S. Cl.
CPC ............ G01F 15/068 (2013.01); G01F 1/662 (2013.01); G01F 1/667 (2013.01); G01F 15/001 (2013.01)

(58) Field of Classification Search
CPC ...... G01F 15/068; G01F 15/001; G01F 1/662; G01F 1/667
See application file for complete search history.

(56) References Cited

U.S. PATENT DOCUMENTS

| 7,032,461 B2 | 4/2006 | Ueki et al. |
| 2009/0035121 A1* | 2/2009 | Watson .................... F01C 1/126 415/1 |
| 2012/0308409 A1* | 12/2012 | Levine ..................... F04B 43/12 417/274 |
| 2018/0052023 A1* | 2/2018 | Yokohata ................ G01F 1/667 |

FOREIGN PATENT DOCUMENTS

| JP | 2003-99294 | 4/2003 |
| JP | 2007-147631 | 6/2007 |

* cited by examiner

Primary Examiner — Bryan Bui

(57) ABSTRACT

Provided is a flow meter capable of logging data more reliably. In this operation, a detection element repeatedly detects a physical quantity related to a flow rate of a fluid flowing in a pipe in a predetermined sampling cycle. Based on physical quantities, a calculation part sequentially calculates the flow rate of the fluid in the pipe. Further, a time measurement part calculates the time. A control storage part is caused to store a logging target, a logging cycle, and logging start definition information. Based on the logging start definition information, a control part automatically starts logging of the logging target in response to startup of the flow meter, and causes a log storage part to store the time measured by the time measurement part and a numerical value of the logging target in association with each other in every logging cycle.

19 Claims, 16 Drawing Sheets

FIG. 5

DATA NOT SETTABLE BY USER
— CONTROL PROGRAM
— LOGGING TARGET, LOGGING CYCLE, AND LOGGING START DEFINITION INFORMATION (LOGGING START CONDITIONS)

| LOGGING TARGET | SET 1 | SET 2 | SET 3 | LOGGING CYCLE |
|---|---|---|---|---|
| MAXIMUM FLOW RATE | O | O | O | 5 MIN |
| MINIMUM FLOW RATE | O | O | O | 5 MIN |
| MAXIMUM TEMPERATURE | O | | O | 5 MIN |
| MINIMUM TEMPERATURE | O | | O | 5 MIN |
| INTEGRATED FLOW RATE | O | O | | 1 DAY, 1 WEEK, 1 MONTH |
| EVENT | O | O | | EVENT OCCURRENCE TIME |

FIG. 7

DATA SETTABLE BY USER (1) PARAMETERS RELATED TO SENSING PROCESSING

—THRESHOLD USED FOR ON/OFF DETERMINATION

—ON/OFF OPERATION SETTING

—OUTPUT SETTING (2) PARAMETERS RELATED TO LOGGING PROCESSING

—MODE PARAMETER

—SET OF PARAMETERS INDICATING LOGGING TARGETS

—BAUD RATE (TRANSMISSION VELOCITY)

—AMOUNT OF LOG DATA OUTPUT AT ONCE

FLOW METER

CROSS-REFERENCE TO RELATED APPLICATIONS

The present application claims foreign priority based on Japanese Patent Application No. 2017-131551, filed Jul. 4, 2017, the contents of which is incorporated herein by reference.

BACKGROUND OF THE INVENTION

1. Field of the Invention

The present invention relates to a flow meter for calculating a flow rate of a fluid flowing in a pipe.

2. Description of Related Art

A flow meter (flow velocity meter) is used to measure a value of a flow rate of a fluid flowing in a pipe. For example, Japanese Patent Laid-open Publication No. 2007-147631 describes a monitoring system for monitoring a flow velocity of tap water flowing in a water distribution pipe. In this monitoring system, the flow velocity of the tap water is detected by a flow velocity sensor disposed in the water distribution pipe. A flow velocity meter conversion part calculates a measured value corresponding to the flow velocity detected by the flow velocity sensor. The flow velocity meter conversion part has a built-in data logger that stores data such as the measured value of the flow velocity for a predetermined period.

In the monitoring system of Japanese Patent Laid-open Publication No. 2007-147631, the flow velocity sensor and the flow velocity meter conversion part (data logger) are provided independently. Thus, in order to store (log) data, such as the flow velocity detected by the flow velocity sensor, into the data logger, a user needs to give the data logger an operation to instruct execution of logging.

Hence, it is not guaranteed that the data logger always logs data. Suppose the user forgets to perform the operation, even when the flow velocity sensor detects a flow velocity, the data cannot be logged.

SUMMARY OF THE INVENTION

An object of the present invention is to provide a flow meter capable of logging data more reliably.

(1) A flow meter according to the present invention is a flow meter that operates by receiving power from a power supply, the flow meter including: a detection element that repeatedly detects a physical quantity related to a flow rate of a fluid flowing in a pipe in a predetermined sampling cycle; a flow rate calculation part that sequentially calculates the flow rate of the fluid in the pipe based on the physical quantity detected by the detection element; a control storage part that stores a logging target to be logged, the logging target being a part or whole of parameters including the flow rate calculated by the flow rate calculation part, a logging cycle for the logging target, and logging start definition information for defining start of logging of the logging target; a log storage part that stores a numerical value of the logging target; a time measurement part that measures time; and a control part that automatically starts logging of the logging target in accordance with startup of the flow meter based on the logging start definition information stored in the control storage part, and causes the log storage part to store the time measured by the time measurement part and the numerical value of the logging target in association with each other.

This flow meter operates by receiving power from a power supply. In this operation, a detection element repeatedly detects a physical quantity related to a flow rate of a fluid flowing in a pipe in a predetermined sampling cycle. Based on physical quantities detected by the detection element, a flow rate calculation part sequentially calculates the flow rate of the fluid in the pipe. Further, a time measurement part calculates the time. A control storage part is caused to store a logging target, a logging cycle, and logging start definition information. Based on the logging start definition information stored in the control storage part, a control part automatically starts logging of the logging target in response to startup of the flow meter, and causes a log storage part to store the time measured by the time measurement part and a numerical value of the logging target in association with each other in every logging cycle.

With this configuration, the control part automatically performs logging based on the logging target, the logging cycle, and the logging start definition information. Hence, there is no need for the user to perform a separate setting (operation) in order to store the logging target into the log storage part (logging). It is thus guaranteed that the logging target is always stored in the log storage part together with the time measured by the time measurement part after starting the flow meter. As a result, it is possible to log data more reliably.

(2) Each of the logging target, the logging cycle, and the logging start definition information stored in the control storage part may be made up of a parameter not settable by a user, a default parameter decided before setting, or an execution program of the control part. In this case, the user can execute the logging without setting the logging target, the logging cycle, or the logging start definition information.

(3) The flow meter may include a display that displays a current instantaneous flow rate calculated by the flow rate calculation part. The control storage part may further store display format information for identifiably displaying the logging target on the display. The display may simultaneously or switchably display the instantaneous flow rate and the logging target, based on the display format information stored in the control storage part.

In this case, the user can easily visually recognize the logging target together with the current instantaneous flow rate calculated by the flow rate calculation part. Hence, the user can perform simple management and determine the occurrence or non-occurrence of abnormality by using only the flow meter without outputting the logging target to a management device such as a personal computer outside the flow meter. When abnormality occurs, the user can simply analyze the cause thereof by using the flow meter and can also analyze the cause in detail by using the management device outside the flow meter.

(4) The flow meter may include: an operation part that accepts an input based on a user's operation; a setting part that sets a flow rate threshold serving as a reference for comparison with the flow rate calculated by the flow rate calculation part based on the input received by the operation part; a first signal output part that outputs an on/off signal related to the flow rate based on the flow rate calculated by the flow rate calculation part and the flow rate threshold set by the setting part; and a display for displaying the current instantaneous flow rate calculated by the flow rate calculation part. The display may simultaneously or switchably display the instantaneous flow rate, the flow rate threshold, and the logging target.

In this case, the user can easily set the flow rate threshold by operating the operation part. In addition to the current instantaneous flow rate calculated by the flow rate calculation part, the user can easily confirm the threshold set by the setting part by visually recognizing the display.

(5) The display may be capable of selectively displaying the logging target stored in the log storage part in every period corresponding to the logging cycle. In this case, the user can easily visually recognize the logging target in each period. Thus, when abnormality occurs, the user can easily manage the flow meter in each period and analyze the cause of the abnormality.

(6) The flow meter may include a display that displays a current instantaneous flow rate calculated by the flow rate calculation part. The flow rate calculation part may further decide a maximum flow rate and a minimum flow rate within a period corresponding to the logging cycle in every logging cycle from the sequentially calculated flow rate of the fluid in the pipe. The control storage part may further store the maximum flow rate and the minimum flow rate as the logging targets. The control part may cause the log storage part to store the time measured by the time measurement part, the maximum flow rate and the minimum flow rate in association with each other in every logging cycle. The display may simultaneously or switchably display the instantaneous flow rate, the maximum flow rate, and the minimum flow rate.

In this case, the user can easily visually recognize the maximum flow rate and the minimum flow rate in each period together with the current instantaneous flow rate calculated by the flow rate calculation part. By visually recognizing the maximum flow rate and the minimum flow rate, the user can simply analyze a cause when trouble occurs in the pipe, based on the maximum flow rate and the minimum flow rate. Further, the volume of the logging target data to be stored into the log storage part is reduced, so that the logging target can be stored in the log storage part for a longer period.

(7) The flow meter may include a display that displays a current instantaneous flow rate calculated by the flow rate calculation part. The control storage part may store the instantaneous flow rate as the logging target. The control part may cause the log storage part to store the time measured by the time measurement part and the instantaneous flow rate in association with each other in every logging cycle. The flow rate calculation part may further decide a maximum flow rate and a minimum flow rate within a period corresponding to the logging cycle in every logging cycle from the instantaneous flow rate stored in the log storage part. The display may simultaneously or switchably display the instantaneous flow rate, the maximum flow rate, and the minimum flow rate.

In this case, the user can easily visually recognize the maximum flow rate and the minimum flow rate in each period, together with the current instantaneous flow rate calculated by the flow rate calculation part without logging the maximum flow rate and the minimum flow rate as the logging targets. By visually recognizing the maximum flow rate and the minimum flow rate, the user can simply analyze a cause when trouble occurs in the pipe.

(8) The flow meter may include a display that displays a current instantaneous flow rate calculated by the flow rate calculation part. The flow rate calculation part may further calculate an integrated flow rate from the sequentially calculated flow rate of the fluid in the pipe. The control storage part may further store the integrated flow rate as the logging target. The control part may cause the log storage part to store the time measured by the time measurement part and the integrated flow rate in association with each other in every logging cycle. The display may simultaneously or switchably display the instantaneous flow rate and the integrated flow rate.

In this case, the user can easily manage the flow rate of the fluid based on the logged integrated flow rate. Further, the user can easily visually recognize the current instantaneous flow rate calculated by the flow rate calculation part and the integrated flow rate in each period. By visually recognizing the integrated flow rate, the user can simply analyze a cause when trouble occurs in the pipe.

(9) The flow meter may include a display that displays a current instantaneous flow rate calculated by the flow rate calculation part. The control storage part may store the instantaneous flow rate as the logging target. The control part may cause the log storage part to store the time measured by the time measurement part and the instantaneous flow rate in association with each other in every logging cycle. The flow rate calculation part may further calculate an integrated flow rate from the instantaneous flow rate stored in the log storage part. The display may simultaneously or switchably display the instantaneous flow rate and the integrated flow rate.

In this case, the user can easily manage the flow rate of the fluid based on the integrated flow rate without logging the integrated flow rate as the logging target. Further, the user can easily visually recognize the current instantaneous flow rate calculated by the flow rate calculation part and the integrated flow rate in each period. By visually recognizing the integrated flow rate, the user can simply analyze a cause when trouble occurs in the pipe.

(10) The flow meter may further include a temperature measurement part that measures a temperature of a fluid. The control storage part may further store a representative temperature within a period corresponding to the logging cycle based on the temperature measured by the temperature measurement part as the logging target. The control part may cause the log storage part to store the time measured by the time measurement part and the representative temperature in association with each other in every logging cycle. In this case, the user can easily manage the temperature of the fluid based on the logged representative temperature. When trouble occurs in the pipe due to the temperature, the user can easily and simply analyze the cause of the trouble.

(11) The flow meter may further include a second signal output part that outputs a binary signal based on the flow rate calculated by the flow rate calculation part. The control storage part may further store a history of the change when the state of the binary signal output by the second signal output part changes within a period corresponding to the logging cycle. The control part may cause the log storage part to store the time measured by the time measurement part and the change history in association with each other in every logging cycle. In this case, the user can easily manage the history of the change in state of the logged binary signal. Further, the user can easily and simply determine whether or not trouble has occurred in the pipe by visually recognizing the change in state of the binary signal.

(12) The flow meter may further include a parameter selection part that accepts selection of a parameter to be the logging target. In this case, the user can select a desired parameter as the logging target while causing automatic execution of the logging. Thus, the usefulness of the flow meter can be improved.

(13) The flow meter may further include a data output part provided capable of outputting the logging target stored in the log storage part. In this case, it is possible to output the logging target to the outside of the flow meter. As a result, it is possible for the external management device to manage the flow rate of the fluid in detail based on the logging target. When trouble occurs in the pipe, the user can easily analyze the cause of the trouble in detail by using the management device.

(14) The control part may initialize an operation state of the detection element in response to receiving power from the power supply. The flow rate calculation part may operate after initialization by the control part. In this case, after the operation state of the detection element has been initialized, the logging target is stored into the log storage part. Thus, inappropriate information before the initialization of the operation state of the detection element is prevented from being stored into the log storage part as the logging target.

(15) The log storage part may include a ring buffer. When a logging target is stored into all storage areas of the ring buffer, the control part may overwrite the logging target stored last and stores the latest logging target. In this case, it is possible to prevent logging targets from being not stored in the log storage part due to insufficient capacity of the ring buffer.

(16) The time measurement part may include a real-time clock that operates independently of power supply from the power supply. The control part may cause the log storage part to store an absolute time based on the real-time clock and the logging target in association with each other. In this case, the period corresponding to the logging cycle can be associated with the absolute time. This makes it easier to manage the logging target.

(17) The flow meter may further include a secondary battery that is charged with power from the power supply and supplies power to the real-time clock. In this case, there is no need to frequently replace the secondary battery. Thus, the maintainability of the flow meter can be improved.

(18) The flow meter may further include a mode selection part that accepts selection of an operation mode to be executed by the control part out of a first operation mode in which the logging target is stored into the log storage part and a second operation mode in which the logging target is not stored into the log storage part. In this case, the user can stop the logging depending on the use.

(19) The detection element may detect at least one of transmission of ultrasonic waves to the fluid flowing in the pipe and reception of ultrasonic waves from the fluid flowing in the pipe to detect the ultrasonic waves. The flow rate calculation part may sequentially calculate the flow rate of the fluid in the pipe based on the ultrasonic waves detected by the detection element. In this case, the flow rate of the fluid flowing in the pipe by can be detected from the outside of the pipe by using ultrasonic waves.

According to the present invention, it is possible to log data more reliably.

BRIEF DESCRIPTION OF DRAWINGS

FIG. 5 is a diagram schematically showing various pieces of data stored in a control storage part;
FIG. 7 is a diagram schematically showing various pieces of data stored in a log storage part.

DETAILED DESCRIPTION OF PREFERRED EMBODIMENTS (1) Schematic Configuration of Flow Meter Hereinafter, a flow meter according to an embodiment of the present invention will be described with reference to the drawings. FIG. 2 is a schematic sectional view showing an internal configuration of a flow meter 100 of FIG. 1. As shown in FIG. 1, in the present embodiment, clamp members 1, 2 are mounted on the outer peripheral surface of a relatively large pipe P by a mounting tool in a state where the clamping members face each other across the pipe P. The diameter of the pipe P is, for example, 40 mm to 200 mm. Fluid flows in the pipe P.

As shown in FIGS. 1 and 2, the flow meter 100 includes casings 10, 20, main units 30, 40, a control board 50, a power supply board 60, a display board 70, and a terminal block 80. In the casing 10, the main unit 30, the control board 50, the power supply board 60, the display board 70, and the terminal block 80 are accommodated. The main unit 40 is accommodated in the casing 20. The casings 10, 20 are fixed to the clamp members 1, 2 by a plurality of fixing screws 101. As a result, the flow meter 100 is mounted on the outer peripheral surface of the pipe P.

Figure 1:
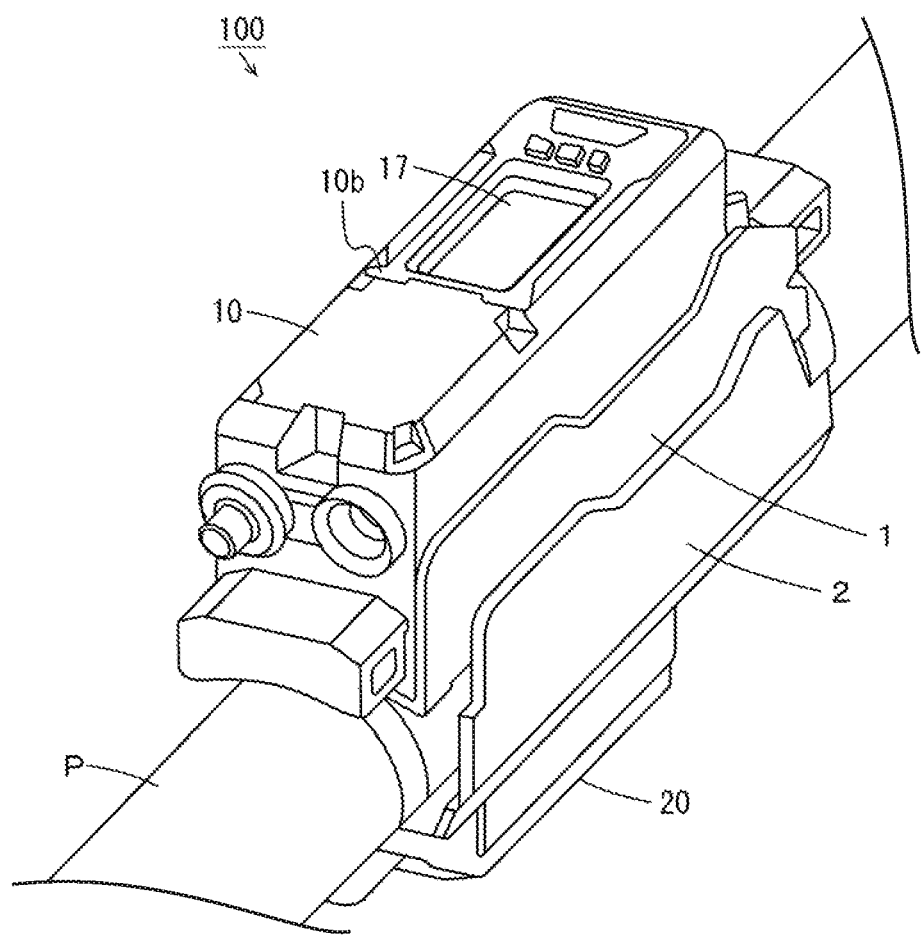
FIG. 1 is an external perspective view of a flow meter according to an embodiment of the present invention.

The casing 10 has an elongated shape extending along the direction in which the fluid flows (the axial direction of the pipe P). Hereinafter, in the casing 10, the direction toward the pipe P is defined as a downward direction, and the opposite direction is defined as an upward direction. The vertical direction of the casing 10 is orthogonal to the longitudinal direction and the width direction of the casing 10.

The casing 10 is mounted on the pipe P by the clamp member 1, with a part of the lower part of the casing 10 in contact with the pipe P. The surface of the casing 10 mounted on the pipe P is referred to as a mounting surface 10a, and the surface of the casing 10 opposite from the mounting surface 10a is referred to as a main surface 10b. On the main surface 10b of the casing 10, a translucent window member 17 is provided.

A vertically penetrating opening h1 is formed on the mounting surface 10a of the casing 10. A pair of projections 10p projecting downward is formed on the mounting surface 10a. A temperature measurement part 102 is, for example, a thermistor. The pair of projections 10p is arranged so as to longitudinally face each other across the opening h1. A temperature measurement part 102 is provided on one projection 10p. In a state where the casing 10 is mounted on the pipe P, the pair of projections 10p is in contact with the pipe P, and the mounting surface 10a is not in contact with the pipe P. The temperature of the fluid is measured by the temperature measurement part 102 through the pipe P by one projection 10p coming into contact with the pipe P.

The casing 20 is mounted on the pipe P by the clamp member 2 in a state where a part thereof is in contact with the pipe P. A vertically penetrating opening h2 is formed on a mounting surface 20a of the casing 20 mounted on the pipe P. A pair of projections 20p similar to the projections 10p is formed on the mounting surface 20a.

The main unit 30 includes a detection element 31, a path member 32, and an acoustic couplant 33 having a solid shape. In the present embodiment, the detection element 31 is an ultrasonic element, is disposed to transmit and receive ultrasonic waves to and from the pipe P at a predetermined angle, and is joined to the upper portion of the path member 32 with an acoustic cement.

The path member 32 is formed of a material that is non-metallic and has high rigidity and high sound permeability. Further, the path member 32 is preferably formed of a material having high environmental resistance. In the present example, the path member 32 is formed of polyphenylene sulfide (PPS) resin or ULTEM (registered trademark) resin. The path member 32 is mounted on the casing 10 with a seal member, not shown, interposed so as to close the opening h1. The lower surface of the path member 32 protrudes slightly downward from the opening h1. The amount of projection of the lower surface of the path member 32 from the mounting surface 10a is smaller than the amount of projection of each projection 10p from the mounting surface 10a.

The acoustic couplant 33 is mounted on the lower surface of the path member 32. By mounting the casing 10 on the pipe P, the acoustic couplant 33 is disposed between the lower surface of the path member 32 and the outer peripheral surface of the pipe P in a slightly crushed state. Note that the pair of projections 10p regulates the crushed amount of the acoustic couplant 33.

The main unit 40 includes a detection element 41, a path member 42, and an acoustic couplant 43 respectively having the same configurations as those of the detection element 31, the path member 32, and the acoustic couplant 33. The detection element 41 is disposed to transmit and receive ultrasonic waves to and from the pipe P at a predetermined angle, and is joined to the path member 42 with an acoustic cement. The path member 42 is mounted on the casing 20 with a seal member, not shown, interposed so as to close the opening h2. The acoustic couplant 43 is disposed between the path member 42 and the pipe P.

In the above arrangement (so-called Z-type arrangement), the ultrasonic waves transmitted by the detection element 31 are incident on the fluid in the pipe P at an incident angle θ through the path member 32 and the acoustic couplant 33. The ultrasonic waves having passed through the fluid pass through the pipe P at an exit angle θ, and are received by the detection element 41 through the acoustic couplant 43 and the path member 42. The ultrasonic waves transmitted by the detection element 41 are incident on the fluid in the pipe P at an incident angle θ through the path member 42 and the acoustic couplant 43. The ultrasonic waves having passed through the fluid are transmitted through the pipe P at an exit angle θ, and are received by the detection element 31 through the acoustic couplant 33 and the path member 32.

The control board 50 is connected to the main unit 30 in the casing 10 and connected to the main unit 40 in the casing 20 through a cable 5. The control board 50 calculates the velocity and the flow rate of the fluid flowing in the pipe P based on an output signal indicating the result of the transmission and reception of the ultrasonic waves output from the main units 30, 40, and also controls operations of various mechanisms in the flow meter 100.

The power supply board 60 converts a high voltage (e.g., AC voltage of 100 V to 240 V) input from a plurality of terminals provided on the terminal block 80 to a low voltage (e.g., DC voltage of smaller than 36 V), and outputs the converted voltage to the control board 50 and the display board 70. Note that the power supply board 60 may include a capacitor for power storage. As a result, even when a voltage input from the terminal block 80 is momentarily interrupted, the power supply board 60 can continue to output the voltage to the control board 50 and the display board 70.

The display board 70 is provided with a display 71 including a reflecting member and a light shielding member. In the present embodiment, the display 71 is a segment display device, but may be a dot matrix display device or a liquid crystal display device. Various pieces of information such as the velocity and flow rate of the fluid, calculated by the control board 50, are displayed on the display 71. The user can visually recognize the display 71 from above the casing 10 through the window member 17.

The terminal block 80 is provided with a plurality of terminals to be connected to devices outside the casing 10. Detailed structures of the casing 10, the control board 50, and the terminal block 80 will be described later.

(2) Casing

Figure 3:
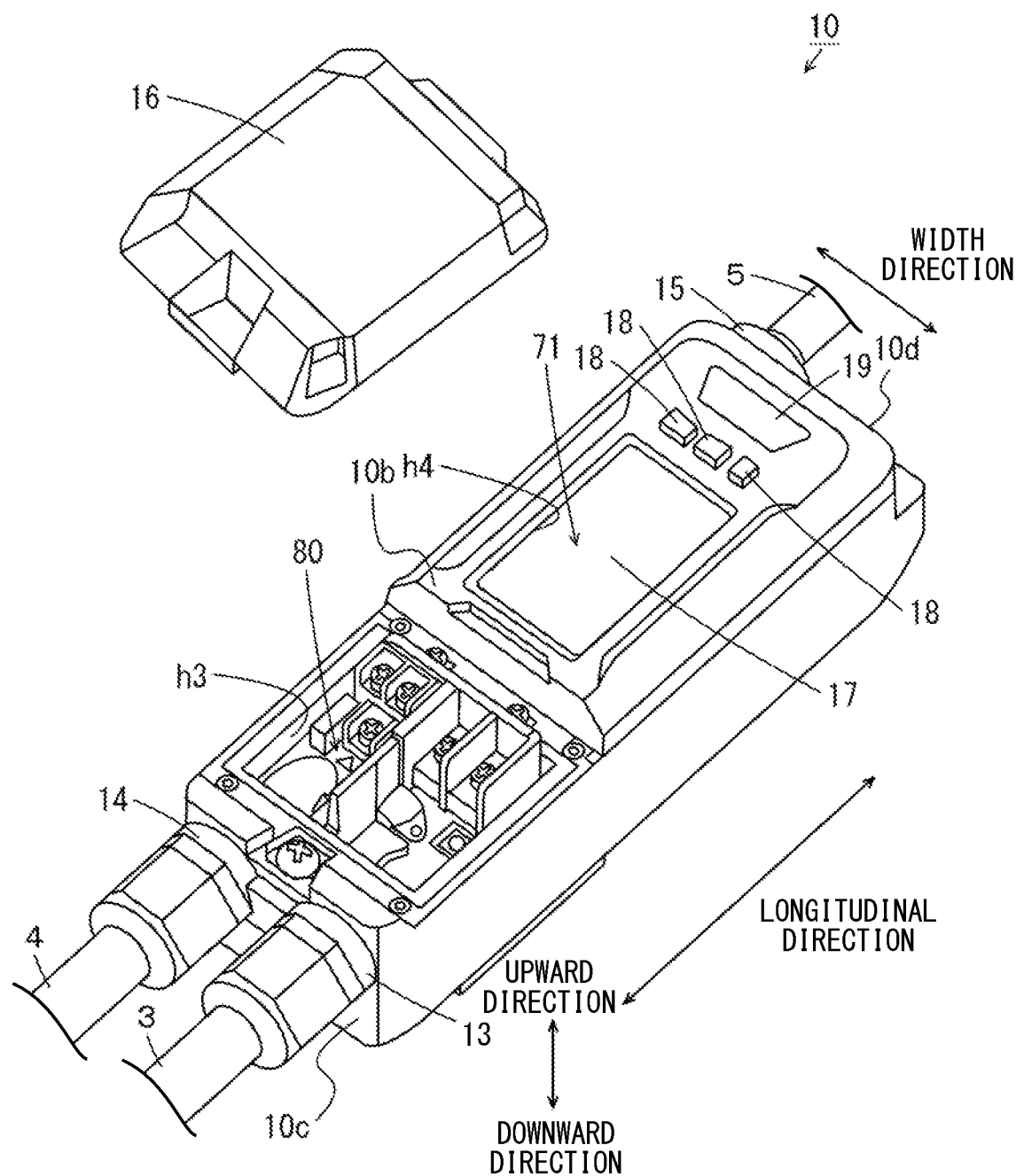
FIG. 3 is a perspective view of a casing.

FIG. 3 is a perspective view of the casing 10. As shown in FIG. 3, one end face in the longitudinal direction of the casing 10 is referred to as an end face 10c, and the other end face is referred to as an end face 10d. On the end face 10c of the casing 10, ports 13, 14 for connecting cables 3, 4 are formed so as to be aligned widthwise. The port 13 holds the cable 3 while passing the cable 3 from the outside to the inside of the casing 10. The port 14 holds the cable 4 while passing the cable 4 from the outside to the inside of the casing 10.

Figure 2:
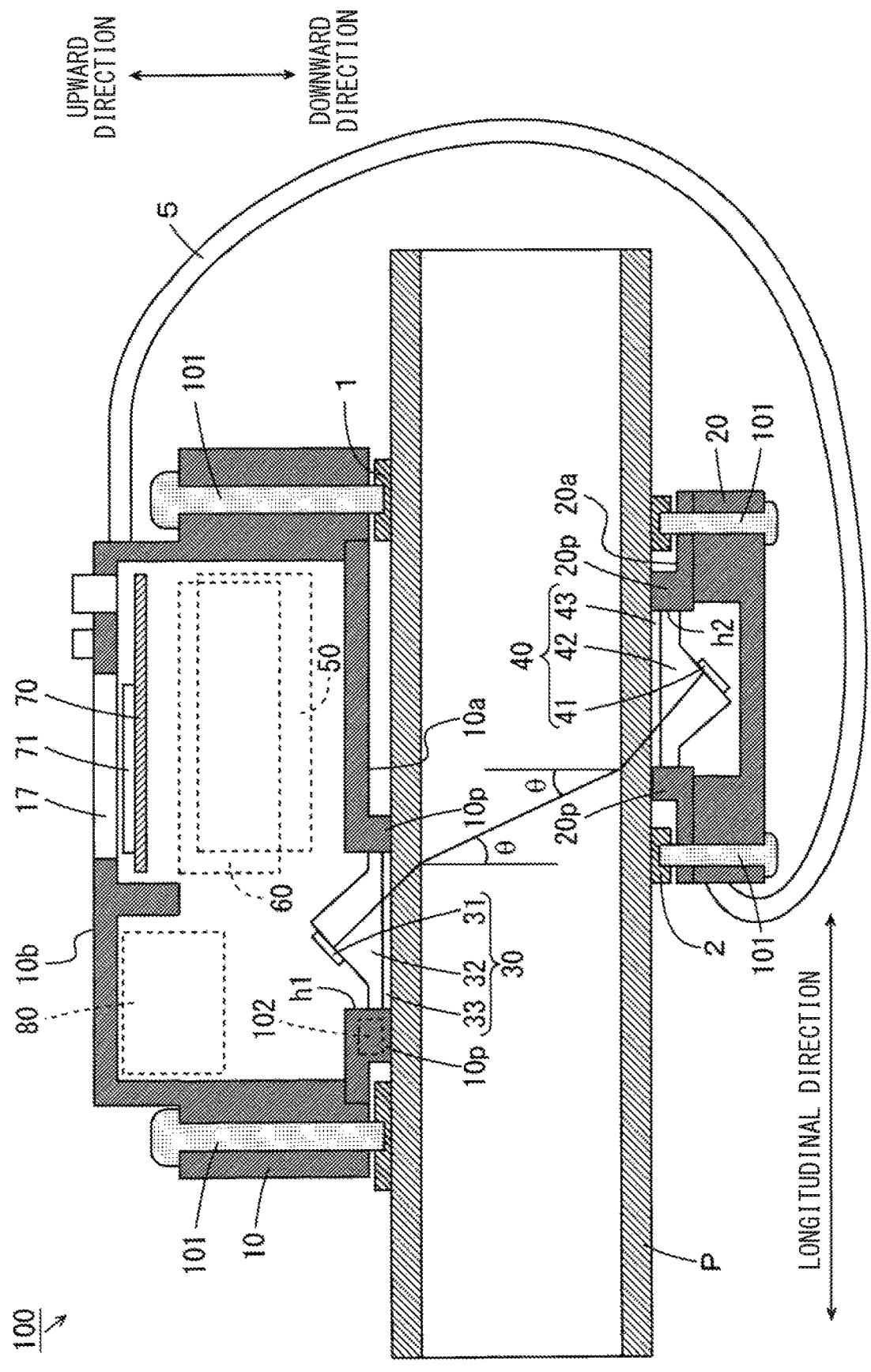
FIG. 2 is a schematic sectional view showing an internal configuration of the flow meter of FIG. 1.

The cable 3 is provided with a plurality of electric wires for inputting a voltage from an external power supply 200 (FIG. 4 described later) of the casing 10 to the power supply board 60 of FIG. 2. The external power supply 200 is a commercial power supply that supplies an AC voltage of 100 V to 240 V, for example. The cable 4 is provided with a plurality of electric wires for transmitting signals between an external device 300 (FIG. 4 described later) and the control board 50 of FIG. 2. The external device 300 is mainly a programmable logic controller (PLC), but may be a personal computer (PC). A plurality of electric wires of the cables 3, 4 are connected to a plurality of terminals of the terminal block 80. In FIG. 3, illustration of the electric wires of the cables 3, 4 is omitted.

On the end face 10d of the casing 10, a connection part 15 connected to the control board 50 of FIG. 2 inside the casing 10 is formed. One end of the cable 5 is connected to the connection part 15 of the casing 10 and the other end of the cable 5 is connected to the main unit 40 in the casing 20 of FIG. 2. A control signal (an excitation signal of the detection element 41) for control is given from the control board 50 to the main unit 40 through the cable 5, and an ultrasonic output signal is given from the main unit 40 to the control board 50.

On the main surface 10b of the casing 10, vertically penetrating openings h3, h4 in a substantially rectangular shape are formed so as to be aligned in this order longitudinally from the end face 10c toward the end face 10d. In the casing 10, the terminal block 80 is disposed at a position vertically overlapping the opening h3 and close to the opening h3. As a result, the terminal block 80 in the casing 10 is exposed from the opening h3. Hence the user can easily perform the operation of connecting the plurality of electric wires in the cables 3, 4 to the plurality of terminals of the terminal block 80 and the operation of outputting the log data described later from above the casing 10.

When the connection work and the log data output work are not performed, the cover member 16 for covering the opening h3 is mounted on the main surface 10b of the casing 10 with a seal member, not shown, interposed. As a result, the terminal block 80 is protected, and the user is prevented from coming into contact with the terminal of the terminal block 80.

The window member 17 is fitted into the opening h4 with a seal member, not shown, interposed. The window member 17 is formed of glass, for example. In the casing 10, the display 71 vertically overlaps the window member 17 and is disposed at a position close to the window member 17. As a result, the user can visually recognize the display 71 in the casing 10 from above the casing 10 through the window member 17.

On the main surface 10b of the casing 10, a plurality of (three in the present example) operation parts 18 are provided so as to be aligned widthwise close to one side of the opening portion h4. The operation parts 18 are connected to the control board 50 through the display board 70 of FIG. 2. The operation parts 18 are used to input various pieces of information to the flow meter 100. The various pieces of information include information (e.g., the inner diameter of the pipe P) necessary for calculating the velocity of the fluid flowing in the pipe P and a threshold concerning the flow rate of the fluid flowing in the pipe P.

An indicator lamp 19 is provided in the vicinity of the end face 10d on the main surface 10b of the casing 10. The indicator lamp 19 includes, for example, a plurality of light emitting diodes for emitting light of different colors, and is connected to the control board 50 through the display board 70. As will be described later, the flow meter 100 also operates as a flow rate switch. The indicator lamp 19 lights up in different display states (e.g., color) according to the operation state of the flow rate switch.

(3) Control Board

Figure 4:
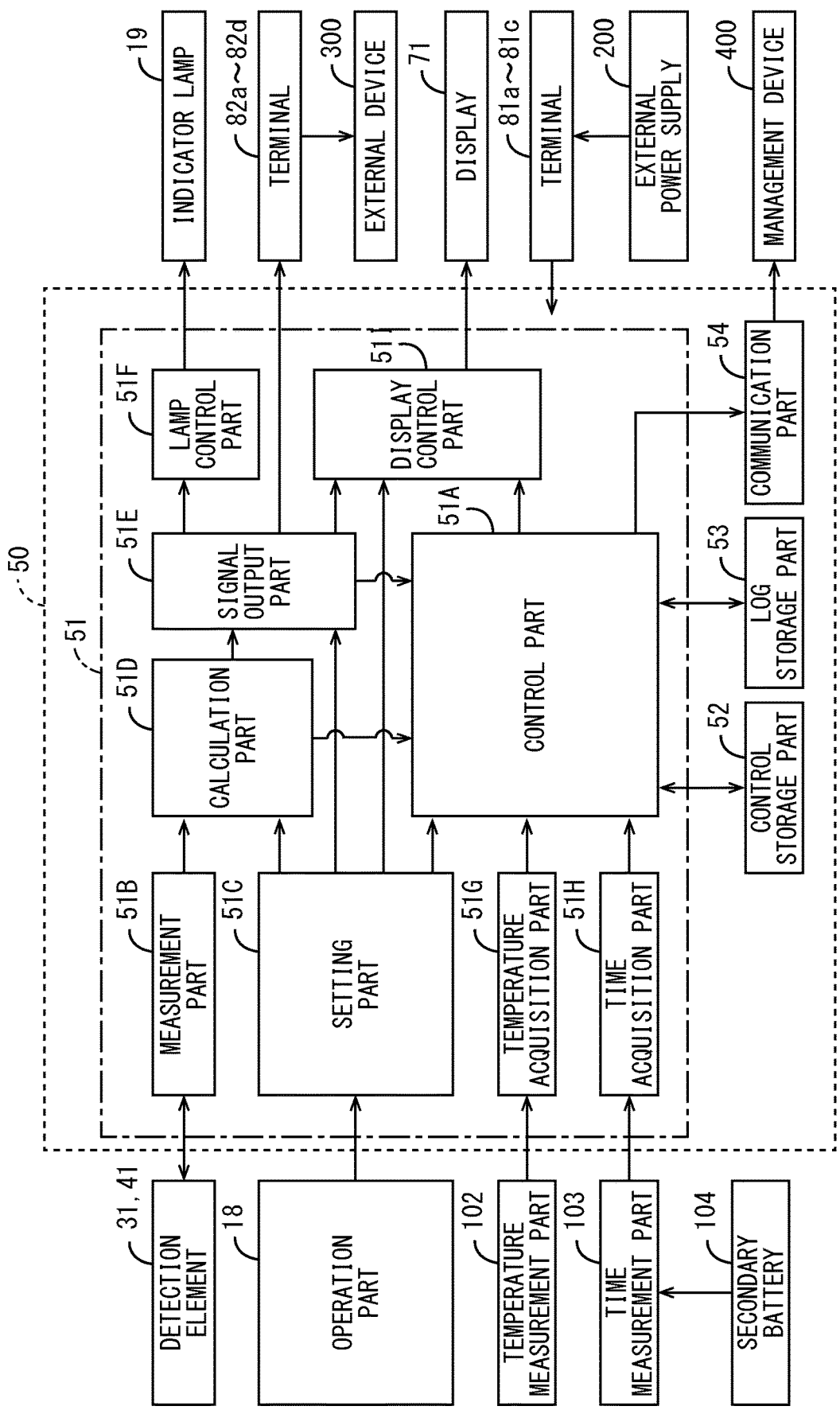
FIG. 4 is a block diagram showing a configuration of a control board.

FIG. 4 is a block diagram showing a configuration of the control board 50. As shown in FIG. 4, a microcomputer 51, a control storage part 52, a log storage part 53, and a communication part 54 are mounted on the control board 50. In FIG. 4, the control board 50 is illustrated by a dotted line, and the microcomputer 51 is illustrated by a one-dot chain line. The microcomputer 51 is achieved by, for example, a central processing unit (CPU), a built-in analog and digital (A/D) converter, and a built-in memory (cache memory, etc.). The microcomputer 51 includes a control part 51A, a measurement part 51B, a setting part 51C, a calculation part 51D, a signal output part 51E, a lamp control part 51F, a temperature acquisition part 51G, a time acquisition part 51H, and a display control part 51I.

In the present embodiment, the measurement part 51B and the temperature acquisition part 51G are achieved by the built-in A/D converter of the microcomputer 51, but the present invention is not limited thereto. For example, the measurement part 51B and the temperature acquisition part 51G may be achieved by an external A/D converter provided outside the microcomputer 51. That is, a part or the whole of the functional blocks in the control board 50 of FIG. 4 may be made up of hardware such as an electronic circuit.

The control storage part 52 is made up of, for example, a nonvolatile memory, a hard disk or a flash read only memory (ROM) and stores (holds) various pieces of data and control programs (system programs) for operating the flow meter 100. By the control part 51A reading and executing the system program of the control storage part 52, the functions of the measurement part 51B, the setting part 51C, the calculation part 51D, the signal output part 51E, the lamp control part 51F, the temperature acquisition part 51G, the time acquisition part 51H, and the display control part 51I are achieved.

The log storage part 53 is made up of a nonvolatile memory such as an electrically erasable and programmable (EEP) ROM, for example, and stores various pieces of data that can be set by the user (rewritable by the user) in order to operate the flow meter 100.

When executing the control program, the control part 51A refers to data stored in the control storage part 52 or the log storage part 53 as necessary. In the present embodiment, the control storage part 52 and the log storage part 53 are achieved by separate memories, but the present invention is not limited thereto. For example, by allocating a storage area, the control storage part 52 and the log storage part 53 may be achieved by a common memory.

The flow meter 100 is brought into a startup state when the power supply is turned on. In the present embodiment, when the power supply is turned on, power (voltage) is supplied from the external power supply 200 to the microcomputer 51 via the plurality of terminals 81a to 81c provided on the terminal block 80 of FIG. 2 and the power supply board 60 of FIG. 2.

In a startup state, the control part 51A reads and executes the control program stored in the control storage part 52, and executes startup processing (preparation) including sensing processing for calculating a normal flow rate and logging processing in every fixed period. In the present embodiment, the logging target, the logging cycle, and the logging start definition information which are necessary for the logging processing are previously incorporated into the control program.

Here, "the logging target, the logging cycle, and the logging start definition information are previously incorporated into the control program" means that the logging target, the logging cycle, and the logging start definition information are included in the control program. In other words, the logging target, the logging cycle, and the logging start definition information correspond to a part of the execution program of the control part 51A.

Further, the control part 51A reads the thresholds and the like which are stored in the log storage part 53 and used for on/off determination, and refers to and sets various parameters necessary for the sensing processing. Here, if an operation mode (a second operation mode described later) in which the logging processing is not executed has been selected by the user, the logging processing is not executed. Details of the pieces of data stored in the control storage part 52 and the log storage part 53 will be described later.

Next, the control part 51A initializes the operation state of the flow meter 100. In the initialization of the operation state, based on an instruction (command) of the control part 51A, for example, optimization of the intensity of ultrasonic waves emitted from the detection elements 31, 41 via the measurement part 51B and subtraction of an initial value (e.g., 0) for a variable to be used in the calculation part 51D, or the like is performed. In the present embodiment, initialization processing is performed in response to an instruction from the control part 51A, but the present invention is not limited thereto, and the initialization processing may be performed by a processing module (e.g., initialization part) other than the control part 51A.

After ending of initialization, the startup of the measurement part 51B, the calculation part 51D, the signal output part 51E, the lamp control part 51F, the temperature acquisition part 51G, the time acquisition part 51H, and the display control part 51I is completed. As a result, the startup state ends and the flow meter 100 is in a steady state.

Hereinafter, the operation of the flow meter 100 in a steady state will be described. The measurement part 51B causes the detection elements 31, 41 to transmit and receive ultrasonic waves and acquires output signals from the detection elements 31, 41. Based on the acquired output signals, the measurement part 51B measures a difference (hereinafter referred to as a time difference) between the time until the detection element 41 receives the ultrasonic waves transmitted by the detection element 31 and the time until the detection element 31 receives the ultrasonic waves transmitted by the detection element 41. The measurement result from the measurement part 51B is given to the calculation part 51D.

The setting part 51C sets various pieces of information input by the user from the operation parts 18. As described above, the information input from the operation parts 18 includes thresholds concerning the inner diameter of the pipe P and the flow rate of the fluid flowing in the pipe P. The inner diameter of the pipe P is used when the calculation part 51D calculates the flow rate. The threshold is used when the signal output part 51E generates a switching signal. The information input from the operation parts 18 includes an operation mode of the control part 51A and information on a display screen to be displayed on the display 71.

The operation mode of the control part 51A includes first and second operation modes. Details will be described later. The information on the display screen is, for example, switching information used for switching the display on the display 71, and is different from display format information (display position, display size, display color, display font, etc.) indicating how to display the logging target on the display 71. For example, the display format information is information used for identifiably displaying the logging target on the display 71. The display format information includes display layout information specifying that, for example, the maximum flow rate is displayed in the upper stage (upper stage display area 71a described later) of the display 71, while the minimum flow rate is displayed in the lower stage (lower stage display area 71b described later). The display format information is stored in the control storage part 52. A part of the setting of information by the setting part 51C may be performed as an initial setting in the startup state.

The calculation part 51D calculates an instantaneous value (instantaneous flow rate) of a flow rate Q of the fluid flowing in the pipe P based on Expression (1) below. Here, Δt is a time difference measured by the measurement part 51B, and d is an inner diameter of the pipe P, set by the setting part 51C. θ is an incident angle of ultrasonic waves, $V_s$ is a velocity of the ultrasonic waves, and K is a flow rate correction coefficient for converting the velocity of the fluid having a predetermined distribution in the cross section of the pipe P into an average velocity. The incident angle θ, the velocity $V_s$, and the flow rate correction coefficient K are known quantities. Further, the calculation part 51D calculates an integrated value (integrated flow rate) of the fluid in the pipe P by integrating the calculated instantaneous flow rates. Moreover, the calculation part 51D can also calculate a velocity $V_f$ of the fluid flowing in the pipe P based on Expression (2) below.

[Expression 1]

$$Q = \frac{1}{K} \cdot \frac{\pi d V_s^2}{8 \tan\theta} \Delta t \tag{1}$$

[Expression 2]

$$V_f = \frac{V_s^2}{2 d \tan\theta} \Delta t \tag{2}$$

The signal output part 51E generates a switching signal (ON/OFF signal) based on the comparison result between the threshold set by the setting part 51C and the instantaneous flow rate calculated by the calculation part 51D, and outputs the generated switching signal (ON/OFF signal) to the external device 300 through the terminals 82a to 82d and the cable 4 of FIG. 3. The switching signal is a binary signal for switching between the on-state and the off-state of the external device 300. In this manner, the flow meter 100 can operate as a flow rate switch that changes the state of the switching signal to be given to the external device 300 based on whether or not the fluid is flowing in the pipe P at a flow rate not smaller than the threshold.

The terminals 82a to 82d are terminals that interface the external device 300 such as a PLC and are provided on the terminal block 80 of FIG. 2 similarly to the terminals 81a to 81c. When the external device 300 is a general-purpose PC or the like instead of the PLC, a communication interface that meets a predetermined standard similar to that the communication part 54 (described later) meets may be provided in the control board 50 instead of the terminals 82a to 82d.

The lamp control part 51F causes the indicator lamp 19 to light up so as to distinguish between the on-state and the off-state of the external device 300. In the present embodiment, the indicator lamp 19 is lit in green when the external device 300 is in the on-state, and lit in red when the external device 300 is in the off-state. Thus, the user can easily distinguish between the on-state and the off-state of the external device 300.

The temperature acquisition part 51G acquires an instantaneous value (instantaneous temperature) of the temperature of the fluid, measured by the temperature measurement part 102. Further, the flow meter 100 is provided with a time measurement part 103. The time measurement part 103 includes, for example, a real-time clock that is operated by a secondary battery 104 independently of turning-on of the power supply, and measures time regardless of whether or not the flow meter 100 has been started up. In the present embodiment, the secondary battery 104 is a lithium battery that can be charged by turning-on of the power supply. The time acquisition part 51H acquires the time measured by the time measurement part 103.

Data in which the time measured by the time measurement part 103 and various pieces of information (logging target) acquired at the time are associated with each other is called log data. In the present embodiment, based on the setting by the setting part 51C, a part or the whole of logging targets, such as the maximum flow rate, the minimum flow rate, the integrated flow rate, the maximum temperature, the minimum temperature, and the history of the occurrence of change in state of the switching signal (event, described later) can be included in the log data. In the present embodiment, since the period of the log data can be associated with the absolute time based on the real-time clock, it is possible to facilitate the management of the log data.

The control part 51A selectively operates in the first operation mode and the second operation mode. Specifically, in the first operation mode, the control part 51A stores the log data into the log storage part 53 in a predetermined format in every predetermined period (five minutes in the present example). In the present embodiment, the period cannot be set as a default value to the user, but the present invention is not limited to thereto. The period may be appropriately settable by the operation of the operation parts 18 or the like. On the other hand, the control part 51A does not cause the log storage part 53 to store the logging target in the second operation mode. Therefore, the user can stop storing the log data by selecting the second operation mode in accordance with the intended use. In the following description, the control part 51A operates in the first operation mode.

The log data is stored in a format (data format) made up of character strings (YEAR, MONTH, DAY, HOUR, MINUTE, FLOW_PEAK, FLOW_BOTTOM, TOTAL_PER_DAY, TEMP_PEAK, TEMP_BOTTOM, EVENT, line feed), for example. Specifically, the data is stored with each piece of data delimited by a comma and each record delimited by a line feed. Thus, the year, month, day, hour and minute when the log data was created, the maximum flow rate, minimum flow rate, integrated flow rate (in units of one day), maximum temperature, minimum temperature, and event history are associated with each other. There are three types of time resolution of the integrated flow rate, which are one day unit, one week unit, and one month unit, but in the above example, the time resolution is set as one day unit for the convenience of description. The time resolution may be one week unit or one month unit, such as TOTAL_PER_WEEK or TOTAL_PER_MONTH.

The data format may be various formats besides the above example. For example, each record may be represented by a comma and a tab, or a special character may be interposed between a record and a record. As described above, the logged logging target is stored in a predetermined data format assuming that the logging target is output by communication to a general-purpose PC or the like. The predetermined data is previously stored into the control storage part 52 and is read and referred to by the control part 51A.

The communication part 54 includes, for example, a communication interface based on a predetermined standard (e.g., RS 232C standard). When the communication cable is connected to an output terminal 86 of FIG. 13 described later, the control part 51A gives the log data stored in the log storage part 53 to a management device 400 through the communication part 54 and the communication cable. The management device 400 is, for example, a PC, and can perform detailed management of the flow rate of the fluid based on the log data, analysis of a detailed cause when a trouble occurs in the pipe P, and the like.

Here, the transmission format at the time of transmitting the logging target may be the same as or different from the data format stored in the control storage part 52. Specifically, in the present embodiment, the transmission format may be the same as a data format at the time of storage into the control storage part 52, namely, a format (data format) made up of a character string (YEAR, MONTH, DAY, HOUR, MINUTE, FLOW_PEAK, FLOW_BOTTOM, TOTAL_PER_DAY, TEMP_PEAK, TEMP_BOTTOM, EVENT, line feed), or in addition to these, CHECKSUM may be added when an output is made to an external general-purpose PC by communication. CHECKSUM is data for error detection, and by adding this last, even if garbled characters occur during communication, the management device 400 can recognize the error.

Further, header information indicating the order of character strings may be included in the transmission format when the log data is transmitted. The header information is information such as a character string (YEAR, MONTH, DAY, HOUR, MINUTE, FLOW_PEAK, FLOW_BOTTOM, TOTAL_PER_DAY, TEMP_PEAK, TEMP_BOTTOM, EVENT). As a result, the management device 400 analyzes the header information to recognize that the character strings (numeral strings) to be received are in the order of YEAR, MONTH, DAY, HOUR, MINUTE, FLOW_PEAK, FLOW_BOTTOM, TOTAL_PER_DAY, TEMP_PEAK, TEMP_BOTTOM, and EVENT.

The display control part 51I causes the display 71 to display a normal display screen and a data display screen in a switchable manner based on the setting of the setting part 51C. The normal display screen is a screen for displaying the threshold set by the setting part 51C, the instantaneous flow rate, the integrated flow rate or the velocity $V_f$ calculated by the calculation part 51D, the instantaneous temperature acquired by the temperature acquisition part 51G, or the like. The data display screen is a screen for displaying information included in the log data in every period of the log data under the control of the control part 51A. Detailed operations of the control part 51A and the display control part 51I will be described later.

(4) Control Storage Part and Log Storage Part

FIG. 5 is a diagram schematically showing various pieces of data stored in the control storage part 52. As shown in FIG. 5, the control storage part 52 stores data that cannot be set by the user. Specifically, in the control storage part 52, in addition to the control program, the logging target, the logging cycle, and the logging start definition information are stored. The logging target indicates an object to be logged among various parameters. The logging cycle indicates a constant cycle when logging targets are logged. The logging start definition information indicates information for defining the start of logging the logging target.

Figure 6:
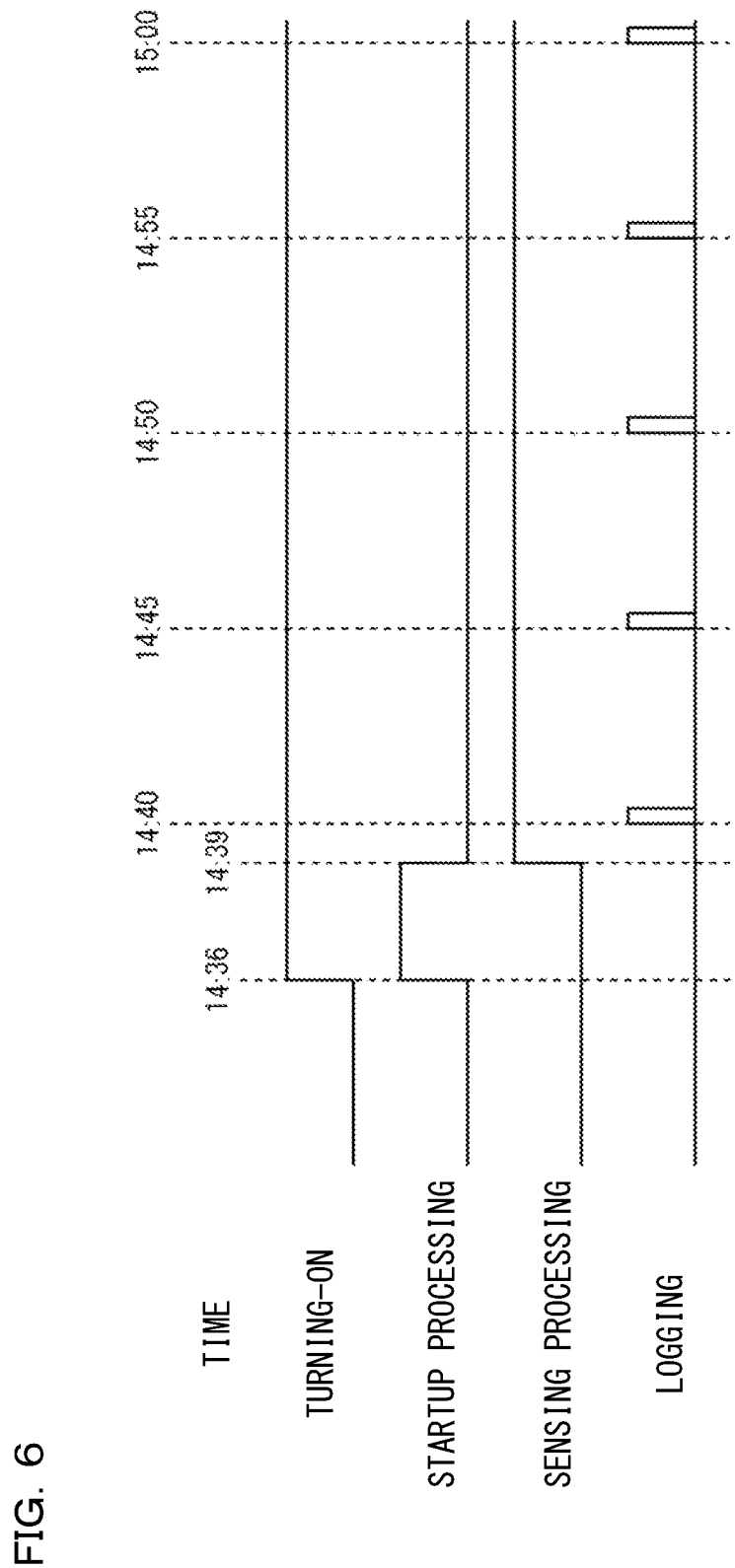
FIG. 6 is a diagram for explaining execution timing of logging based on logging start definition information.

In the present embodiment, the logging start definition information is information specifying that the logging is started when the specific time is reached every five minutes after turning-on of the power supply for the flow meter 100 and after ending of the startup processing of the flow meter 100. FIG. 6 is a diagram for explaining execution timing of logging based on the logging start definition information.

In the example of FIG. 6, when the power supply is turned on for the flow meter 100 at 14:36, startup processing is started at the same time. At 14:39, the startup processing ends, and the sensing processing is started at the same time. After that, logging is executed at 14:40 as a specific time. Also, logging is repeated every five minutes such as 14:45, 14:50, 14:55, and 15:00 As described above, the logging start definition information includes whether or not a specific time, which comes in every predetermined time, has reached since ending of the startup processing.

In the present embodiment, as indicated by a set 1 in FIG. 5, six pieces of information, which are the maximum flow rate, the minimum flow rate, the maximum temperature, the minimum temperature, the integrated flow rate, and the event, are stored as the logging targets. For each of the maximum flow rate, the minimum flow rate, the maximum temperature, and the minimum temperature, "five minutes" is stored as the logging cycle. For the integrated flow rate, one day, one week, and one month are stored as the logging cycle. For the event, the event occurrence time is stored as the logging cycle.

"Five minutes" means that the logging is performed every five minutes at an absolute time, and for example, the logging is performed every five minutes at absolute times such as 14:05, 14:10, and 14:15. "One day" means that the logging is performed at an absolute time, such as 12 o'clock. "One week" means that logging is performed, for example, at 12 o'clock on Sunday, and "one month" means that the logging is performed at 12 o'clock on the first day every month. "Event occurrence time" means that the logging is performed at the timing when an event such as an alarm occurs.

As described above, for the integrated flow rate, a plurality of logging cycles are associated. Hence, at the time of displaying the integrated flow rate in one week unit or one month unit, it is unnecessary to convert the integrated flow rate in one week unit to these flow rates one by one. On the other hand, when a configuration is provided to convert the integrated flow rate in one day unit to the integrated flow rate in one week unit or one month, the logging cycle of one week unit or one month unit does not need to be associated with the integrated flow rate.

As described above, in the present embodiment, the control storage part 52 stores, in addition to the control program, a control program (execution program) including the logging target, the logging cycle, and the logging start definition information, and when the control program is executed by the control part 51A, the logging target is logged automatically. Also, as described above, the user can set none of the logging target, the logging cycle, and the logging start definition information described in the control program.

In this case, the control part 51A reads and executes the control program in response to the turning-on of the external power supply 200, so that the logging target is automatically stored into the log storage part 53 in every logging cycle without the user inputting a trigger for starting the logging into the flow meter 100. This eliminates the need for the user to make a setting required for the logging, such as the logging target or the logging cycle.

In the present embodiment, the logging targets indicated by the set 1 in FIG. 5, the logging cycles, and the logging start definition information are previously incorporated into the control program, but the present invention is not limited thereto. Apart from the control program, each parameter of the logging target, the logging cycle, and the logging start definition information may be stored in the control storage part 52 as a default parameter that cannot be set by the user.

In this case, in response to the turning-on of the external power supply 200, the control part 51A reads and executes the control program and refers to default parameters of the logging target, the logging cycle, and the logging start definition information from the control storage part 52. Also in this case, the logging target is automatically stored into the log storage part 53 in every logging cycle without the user inputting a trigger for starting the logging into the flow meter. This eliminates the need for the user to make a setting required for the logging, such as the logging target or the logging cycle.

Further, in the case where the logging targets indicated by the set 1 in FIG. 5 according to the present embodiment are default parameters which are decided before setting by the user, when the user makes a setting related to the logging, the parameter may be changed from the default value to the value set by the user in accordance with the set content. For example, it may be configured such that the user can select a set of parameters different from those of the set 1 like a set 2 or a set 3 in FIG. 5.

In this case, the selection information may be stored into the log storage part 53. For example, when the user selects the set 2, the control part 51A reads the selection information stored in the log storage part 53 and takes as the logging targets the four parameters which are the maximum flow rate, the minimum flow rate, the integrated flow rate, and the event. When the user selects the set 3, the control part 51A reads the selection information stored in the log storage part 53, and takes as the logging targets the four parameters which are the maximum flow rate, the minimum flow rate, the maximum temperature and the minimum temperature.

In this manner, the user can automatically start the logging without making a setting related to the logging, whereas the user can reflect the setting content in the logging processing when making the setting related to the logging.

FIG. 7 is a diagram schematically showing various pieces of data stored in the log storage part 53. As shown in FIG. 7, the data settable by the user is stored into the log storage part 53. Specifically, setting parameters related to the logging processing and setting parameters related to the sensing processing are stored into the log storage part 53.

The setting parameters related to the sensing processing include a threshold, an on/off operation setting, an output setting, and the like. The threshold is used for on/off determination in the flow rate switch. The on/off operation setting is to set whether to bring the switch into the on-state when the instantaneous value of the flow rate exceeds the threshold or to bring the switch into the off-state when the instantaneous value falls below the threshold. The output setting is to set whether to output a switching signal from the signal output part 51E or output an analog signal indicating the calculated instantaneous flow rate value.

The setting parameters related to the logging processing include a mode parameter, a parameter set indicating a logging target at the time of outputting log data by communication, a baud rate (transmission velocity), an amount of data output at one time, and the like. The mode parameter indicates whether or not to enable the mode (second operation mode) for not executing the logging processing, and no (first operation mode) is set as a default value. Also, as described above, when the user makes a setting related to the logging, the setting information (e.g., selection information of the set 2 or the set 3 in FIG. 5) is also stored in the log storage part 53.

(4) Control Part

Figure 8A:
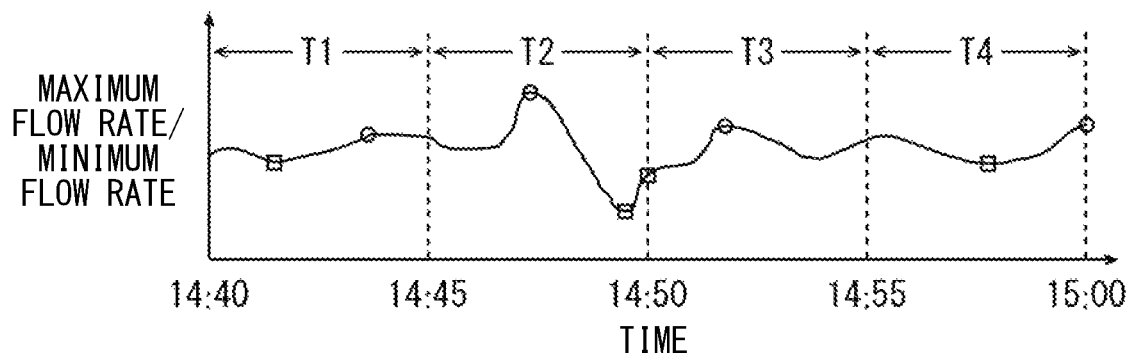
FIGS. 8A to 8D are each a diagram for explaining an operation of a control part.
Figure 8B:
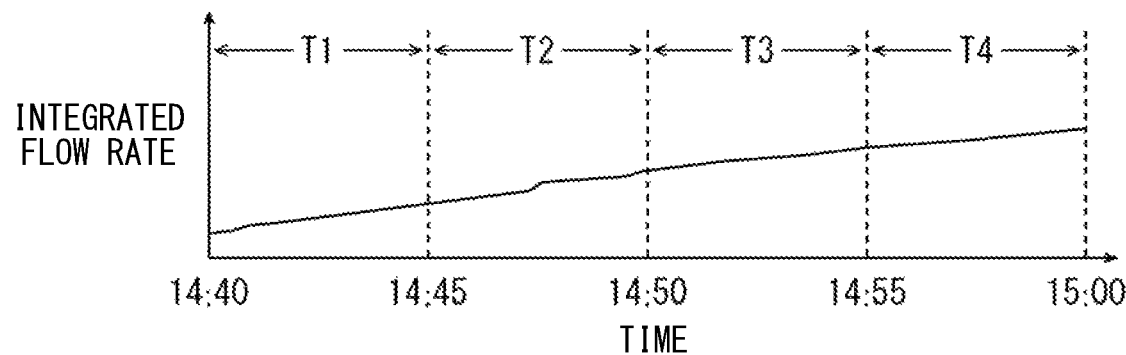
Figure 8C:
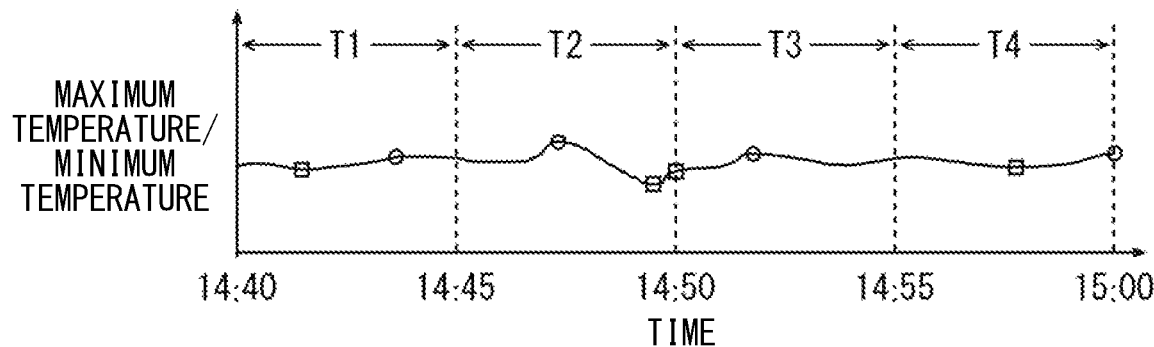
Figure 8D:
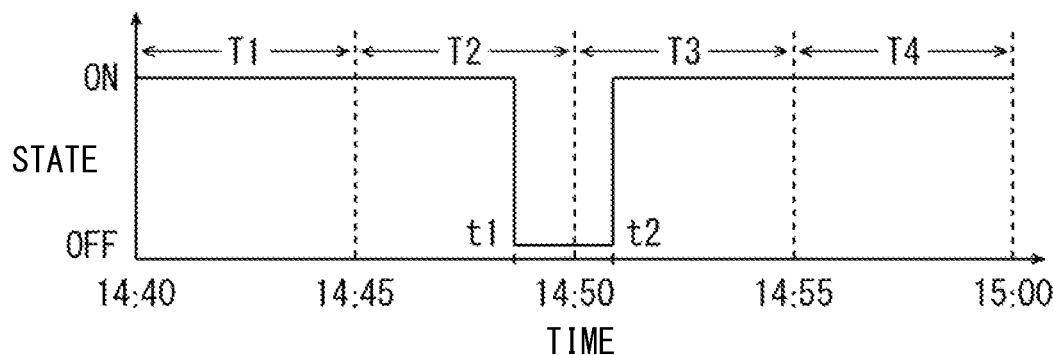

FIGS. 8A to 8D are diagrams for explaining the operation of the control part 51A. A vertical axis in FIG. 8A represents the instantaneous flow rate calculated by the calculation part 51D. A vertical axis in FIG. 8B represents the integrated flow rate calculated by the calculation part 51D. A vertical axis in FIG. 8C represents the instantaneous temperature acquired by the temperature acquisition part 51G. A vertical axis in FIG. 8D represents the value (state) of the switching signal output by the signal output part 51E.

Each of horizontal axes in FIGS. 8A to 8D represent the time from the time 14:40 to the time 15:00. In the description of FIGS. 8A to 8D, a period from the time 14:40 to the time 14:45 is referred to as a period T1, and a period from the time 14:45 to the time 14:50 is referred to as a period T2. A period from the time 14:50 to the time 14:55 is referred to as a period T3, and a period from the time 14:55 to the time 15:00 is referred to as a period T4.

In the example of FIG. 8A, a set of data including the maximum flow rate and the minimum flow rate is set as the information included in the log data. In this case, the control part 51A causes the log storage part 53 to store the maximum and minimum instantaneous flow rates within each of the periods T1 to T4 among the instantaneous flow rates calculated by the calculation part 51D as the maximum flow rate and the minimum flow rate, respectively.

Specifically, the control part 51A sequentially holds the instantaneous flow rates continuously calculated by the calculation part 51D in the period T1, and determines whether the newly held instantaneous flow rate is larger than the maximum instantaneous flow rate previously held within the period T1 or smaller than the minimum instantaneous flow rate previously held within the period T1. When the newly held instantaneous flow rate is larger than the previously stored maximum instantaneous flow rate, the control part 51A decides the newly held instantaneous flow rate as the maximum flow rate within the period T1 and stores the newly stored instantaneous flow rate into the log storage part 53. Similarly, when the newly held instantaneous flow rate is smaller than the previously stored minimum instantaneous flow rate, the control part 51A decides the newly held instantaneous flow rate as the minimum flow rate within the period T1, and stores the newly held instantaneous flow rate into the log storage part 53.

Also in each of the periods T2 to T4 after the period T1, the control part 51A operates similarly. As a result, the periods T1 to T4 and the maximum flow rates and the minimum flow rates in the respective periods T1 to T4 are sequentially stored into the log storage part 53 as the log data of the periods T1 to T4. In FIG. 8A, "○" and "□" are indicated for the maximum flow rate and the minimum flow rate in each of the periods T1 to T4.

In the example of FIG. 8B, a set of data including the integrated flow rate is set as the information included in the log data. In this case, the control part 51A acquires the integrated flow rate calculated by the calculation part 51D at a specific time (e.g., the end time of each of the periods T1 to T4) in each of the periods T1 to T4 and stores the acquired integrated flow rate into the log storage part 53. As a result, the periods T1 to T4 and the integrated flow rates in the respective periods T1 to T4 are sequentially stored into the log storage part 53 as log data of the periods T1 to T4.

In the example of FIG. 8C, a set of data including the maximum temperature and the minimum temperature is set as the information included in the log data. In this case, the control part 51A causes the log storage part 53 to store the highest and lowest instantaneous temperatures within each of the periods T1 to T4 among the instantaneous temperatures acquired by the temperature acquisition part 51G as the maximum temperature and the minimum temperature, respectively.

Specifically, the control part 51A sequentially holds the instantaneous temperatures continuously acquired by the temperature acquisition part 51G in the period T1, and determines whether or not the newly held instantaneous temperature is higher than the highest instantaneous temperature previously held within the time period T1 or lower than the lowest instantaneous temperature previously held within the time period T1. When the newly held instantaneous temperature is higher than the previously held highest instantaneous temperature, the control part 51A decides the newly held instantaneous temperature as the maximum temperature within the period T1, and stores the newly held instantaneous temperature into the log storage part 53. Similarly, when the newly held instantaneous temperature is lower than the previously held lowest instantaneous temperature, the control part 51A decides the newly held instantaneous temperature as the minimum temperature within the period T1, and stores the newly held instantaneous temperature into the log storage part 53.

Also in each of the periods T2 to T4 after the period T1, the control part 51A operates similarly. As a result, the periods T1 to T4 and the maximum temperatures and the minimum temperatures within the respective periods T1 to T4 are sequentially stored into the log storage part 53 as the log data of the periods T1 to T4. In FIG. 8C, "○" and "□" are indicated for the maximum temperature and the minimum temperature in each of the periods T1 to T4.

Hereinafter, a change in state of the switching signal output by the signal output part 51E is referred to as an event. In the example of FIG. 8D, a history of events is set as information included in the log data. In this case, when an event occurs, the control part 51A causes the log storage part 53 to store event information indicating the content of the event.

More specifically, in the periods T1, T4, the state of the switching signal does not change from the on-state. In this case, the control part 51A does not cause the log storage part 53 to store the event information. On the other hand, in the period T2, the switching signal changes from the on-state to the off-state at time t1. Therefore, the control part 51A causes the log storage part 53 to store the event information in the period T2 and its occurrence time t1. Similarly, in the period T3, the switching signal changes from the off-state to the on-state at the time t2, so that the control part 51A causes the log storage part 53 to store the event information in the period T3 and its occurrence time t2. As a result, the periods T2, T3 and the event information and the occurrence times t1, t2 within the periods T2, T3 are sequentially stored in the log storage part 53 as the log data of the periods T2, T3.

Here, in the present embodiment, the log storage part 53 includes a ring buffer, and the above-described log data (logging target) is sequentially stored into this ring buffer. When the log data is stored into all the storage areas of the ring buffer, the control part 51A first deletes the log data stored last into the log storage part 53, and then stores the latest log data into the storage area made available by the deletion. As a result, the log data stored last is overwritten with the latest log data. In this manner, a part of the log storage part 53 functions as the ring buffer, and the log data once stored into the ring buffer is held for a certain period until overwritten by the latest log data.

With this configuration, it is possible to prevent the log data from being not stored into the log storage part 53 due to insufficient capacity of the ring buffer. In the present embodiment, the log data in each period includes the maximum flow rate and the minimum flow rate, and does not include the instantaneous flow rate at other points in time. Similarly, the log data in each period includes the maximum and minimum temperatures and does not include instantaneous temperatures at other points in time. Therefore, the volume of the log data in each period is reduced, so that the log data in each period continues to be stored in the log storage part 53 for a long time before being overwritten.

(5) Display Control Part

FIGS. 9A to 9D are views each showing a display screen of the display 71. As shown in FIGS. 9A to 9D, the display 71 has an upper stage display area 71a and a lower stage display area 71b. Hereinafter, the three operation parts 18 are referred to as an up button 18a, a down button 18b and a mode button 18c, respectively. Further, continuously pressing the up button 18a, the down button 18b, or the mode button 18c for a certain period of time or longer is referred to as "long press", and pressing the up button 18a, the down button 18b, or the mode button 18c shorter than the certain period of time is simply referred to as "push".

By long-pressing the up button 18a, the down button 18b and the mode button 18c at the same time, the user can give an instruction for switching between the normal display screen and the data display screen to the display control part 51I. Every time the instruction is given, the display control part 51I switches between the normal display screen of FIG. 9A and the data display screen of FIG. 9B displayed on the display 71.

Figure 9A:
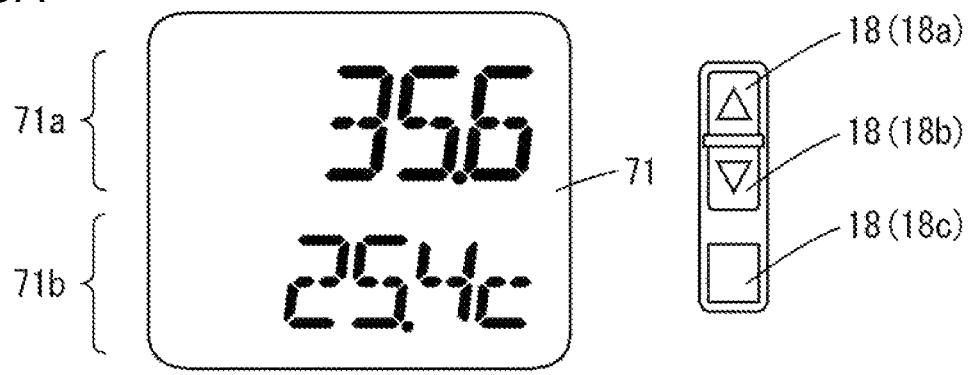
FIGS. 9A to 9D are views each showing a display screen of a display.

In the example of the normal display screen of FIG. 9A, an instantaneous flow rate "35.6 (L/min)" calculated by the calculation part 51D is displayed in the upper stage display area 71a. An instantaneous temperature "25.4° C." acquired by the temperature acquisition part 51G is displayed in the lower stage display area 71b. In the example of the data display screen of FIG. 9B, "September 16" which is a month and a date when the storage of the log data in the period T4 of FIGS. 8A to 8D was started is displayed in the upper stage display area 71a. Also, "14:55" which is the time when the storage of the log data was started is displayed in the lower stage display area 71b.

Figure 9B:
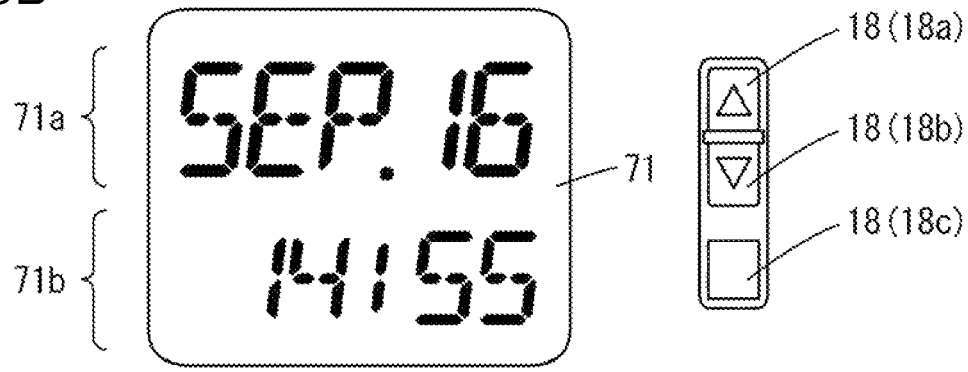

Here, as described above, display format information indicating how the log data is displayed on the display 71 is stored in the control storage part 52. By reading the display format information from the control storage part 52 and referring to the read information, the control part 51A causes the start month and date of logging to be displayed in the upper stage display area 71a and the start hour and minute of logging to be displayed in the lower stage display area 71b, for example as shown in FIG. 9B. Further, as will be described later with reference to FIG. 10, various types of log data are displayed so as to be distinguishable from each other.

Figure 9C:
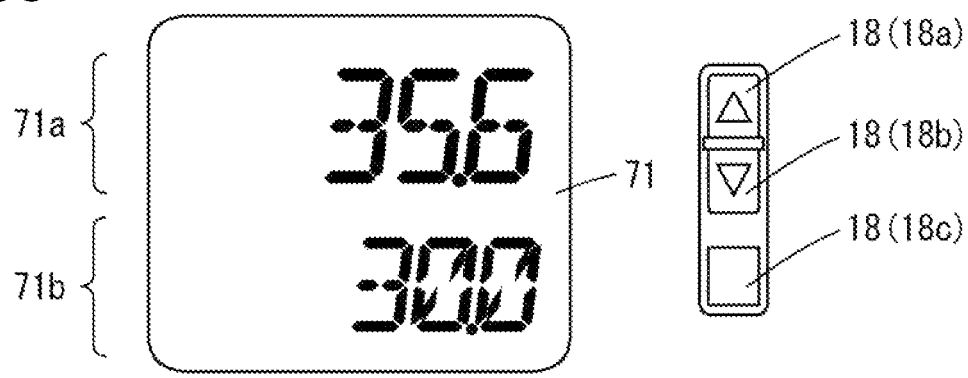
Figure 9D:
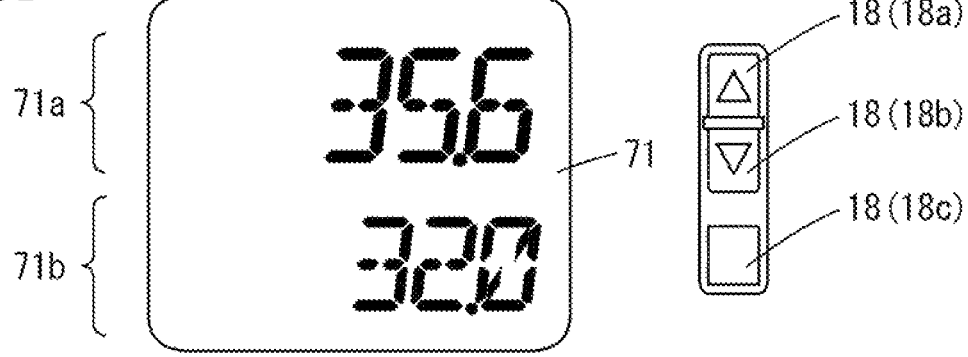

By pressing the mode button 18c on the normal display screen shown in FIG. 9A, the display is switched to the normal display screen shown in FIG. 9C. On the normal display screen shown in FIG. 9C, the current instantaneous flow rate similar to that in FIG. 9A is displayed in the upper stage display area 71a, and the threshold as a reference for comparison with the instantaneous flow rate is displayed in the lower stage display area 71b On the normal display screen shown in FIG. 9C, the threshold can be changed by pressing the up button 18a or the down button 18b. In the example of FIG. 9D, the threshold is changed from 30.0 to 32.0 by pressing the up button 18a. In the present embodiment, the setting of the threshold is also changed simultaneously with the change of the display of the threshold. Specifically, the threshold stored in the log storage part 53 is overwritten with a new numerical value.

In order to prevent an unintentional setting change of the threshold, it is also possible to set a key lock state in which the change of display of threshold is not accepted. In the present embodiment, it is possible to set the key lock state by long-pressing the down button 18b and the mode button 18c. In the key lock state, by long-pressing the down button 18b and the mode button 18c, the key lock state can be canceled.

As described above, in the flow meter 100, the user can freely set the threshold. Therefore, as will be described later with reference to FIGS. 10A to 11H, when the user visually recognizes the log data and finds an abnormal value, the user can adjust the threshold trying to cancel the abnormal state, instead of immediately outputting the log data to the general-purpose PC. For example, when there are many abnormal values logged because the threshold has been too severe (the tolerance has been too narrow), the user may first consider loosening the threshold (widening the tolerance).

FIG. 10A to 10D are views each showing a data display screen for displaying other information included in the log data. By pressing the mode button 18c in a state where the data display screen is displayed on the display 71, the user can give an instruction for displaying other information included in the log data to the display control part 51I. Every time the instruction is given, the display control part 51I sequentially switches the data display screens of FIG. 9B and FIGS. 10A to 10D displayed on the display 71.

Figure 10A:
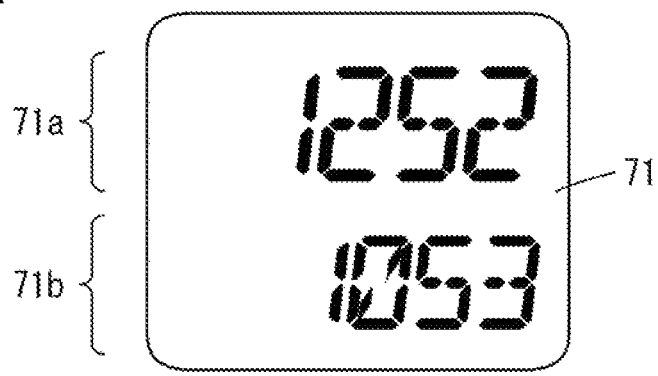
FIGS. 10A to 10D are views each showing a data display screen for displaying other piece of information included in log data.
Figure 10B:
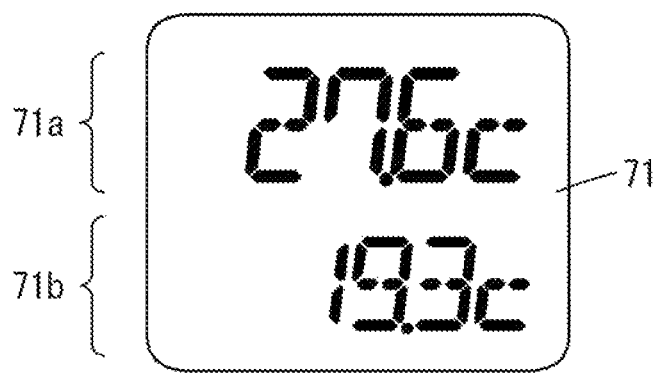

In the example of the data display screen of FIG. 10A, a maximum flow rate "1252 (L/min)" and a minimum flow rate "1053 (L/min)" in a specific period are respectively displayed in the upper stage display area 71a and the lower stage display area 71b. In the example of the data display screen of FIG. 10B, a maximum temperature "27.6° C." and a minimum temperature "19.3° C." in the specific period are respectively displayed in the upper stage display area 71a and the lower stage display area 71b.

Figure 10C:
Figure 10D:
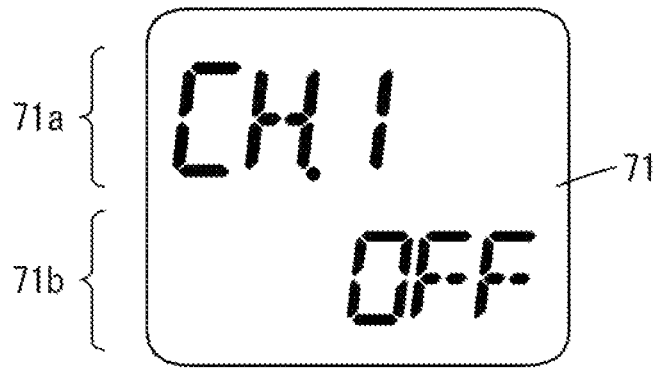

In the example of the data display screen of FIG. 10C, an integrated flow rate "576258 (L/min)" in the specific period is displayed on the display 71. As in the example of FIG. 10C, when the digit of the integrated flow rate value exceeds a predetermined number, the value of the upper digit is displayed left-aligned in the upper stage display area 71a and the lower digit is displayed right-aligned in the lower stage display area 71b.

As will be described later, the signal output part 51E of FIG. 4 is capable of outputting a switching signal from each of the first and second control channels. In the example of the data display screen of FIG. 10D, "the first control channel" which is the control channel where the event occurred in a specific period and "OFF" which is the content of the event are displayed in the upper stage display area 71a and the lower stage display area 71b, respectively. The display of FIG. 10D indicates that the switching signal output from the first control channel has changed from the on-state to the off-state in a specific period.

FIGS. 11A to 11H are diagrams showing data display screens corresponding to respective periods in which log data is stored. As described above, the display format information indicating how the log data (logging target) stored in the log storage part 53 is displayed on the display 71 is previously stored in the control storage part 52 at the time of factory shipment. Therefore, it is not necessary for the user to separately set the setting for visually recognizing log data on the display 71.

Figure 11A:
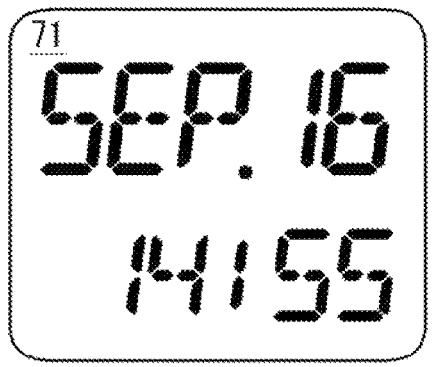
FIGS. 11A to 11H are views showing a data display screens corresponding to respective periods in which the log data is stored.
Figure 11B:
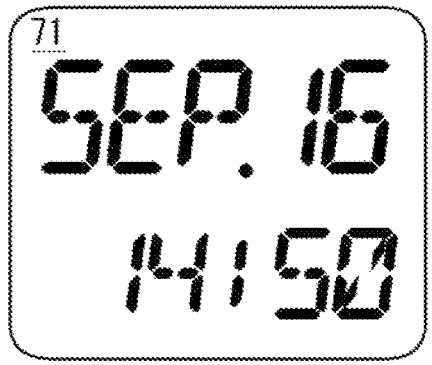
Figure 11C:
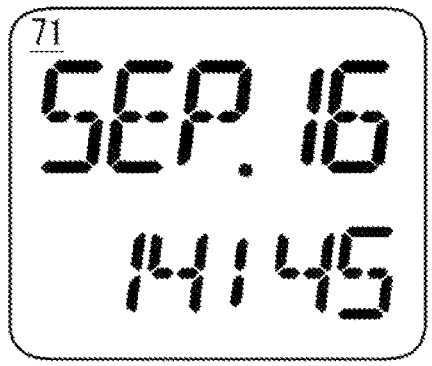
Figure 11D:
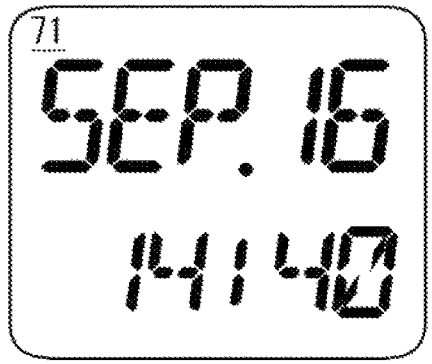
Figure 11E:
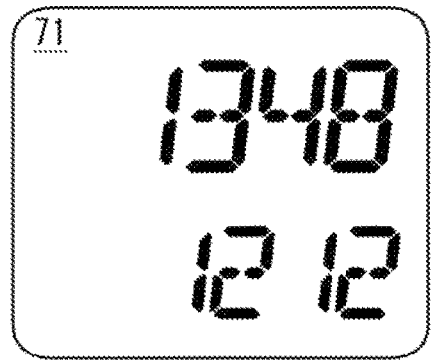
Figure 11F:
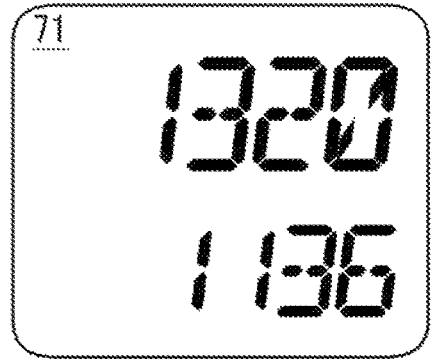
Figure 11G:
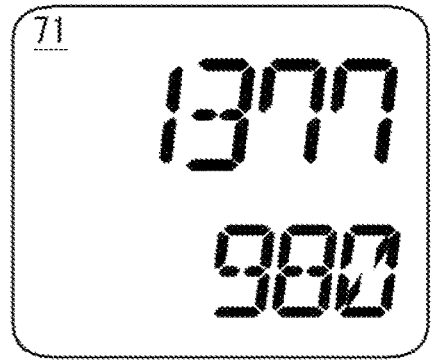
Figure 11H:
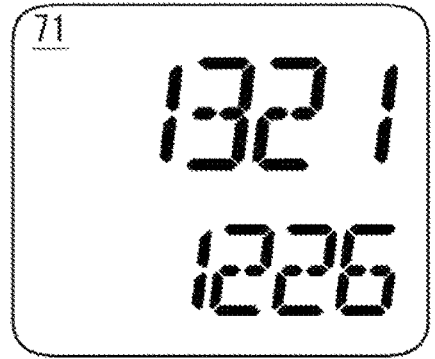

The data display screens of FIGS. 11A to 11D show the start times of periods T4 to T1 of FIGS. 8A to 8D, respectively. The data display screens of FIGS. 11E to 11H show sets of the maximum flow rate and the minimum flow rate during the periods T4 to T1, respectively. When an instruction to display the data display screen is given for the first time, the display control part 51I causes the display 71 to display the data display screen of FIG. 11A showing the start time of the latest log data.

By pressing the up button 18a or the down button 18b, the user can give an instruction for switching the data display screen of FIGS. 11A to 11D to the display control part 51I. Every time the down button 18b is pressed, the display control part 51I sequentially switches the displayed data display screen in the order from the state of FIG. 11A to the state of FIG. 11D. Further, each time the up button 18a is pressed, the display control part 51I sequentially switches the displayed data display screen in the order from the state of FIG. 11D to the state of FIG. 11A.

When the mode button 18c is pressed with the data display screens of FIGS. 11A to 11D being displayed, the display control part 51I respectively switches the data display screens to the displayed data display screen as shown in FIGS. 11E to 11H. Thereafter, every time the down button 18b is pressed, the display control part 51I sequentially switches the displayed data display screen in the order from the state of FIG. 11E to the state of FIG. 11H. Further, every time the up button 18a is pressed, the display control part 51I sequentially switches the displayed data display screen in the order from the state of FIG. 11H to the state of FIG. 11E.

When the mode button 18c is pressed with the data display screen of FIGS. 11E to 11H being displayed, the display control part 51I switches the displayed data display screen to data display screen displaying the other data included in the log data in the same period. When the user finds abnormality in the flow rate, temperature, event or the like in a specific period, the user can easily confirm the other information of the log data in the period by switching the data display screen. As a result, it is possible to simply analyze the cause of the abnormality occurrence.

In this manner, the user can perform simple management and determine the occurrence or non-occurrence of abnormality by using only the flow meter 100 without outputting the log data to the management device 400 outside the flow meter 100. Further, when abnormality occurs, the user can simply analyze the cause by the flow meter, and can analyze the cause in detail by using the management device 400 outside the flow meter 100.

(6) Terminal Block

Figure 12:
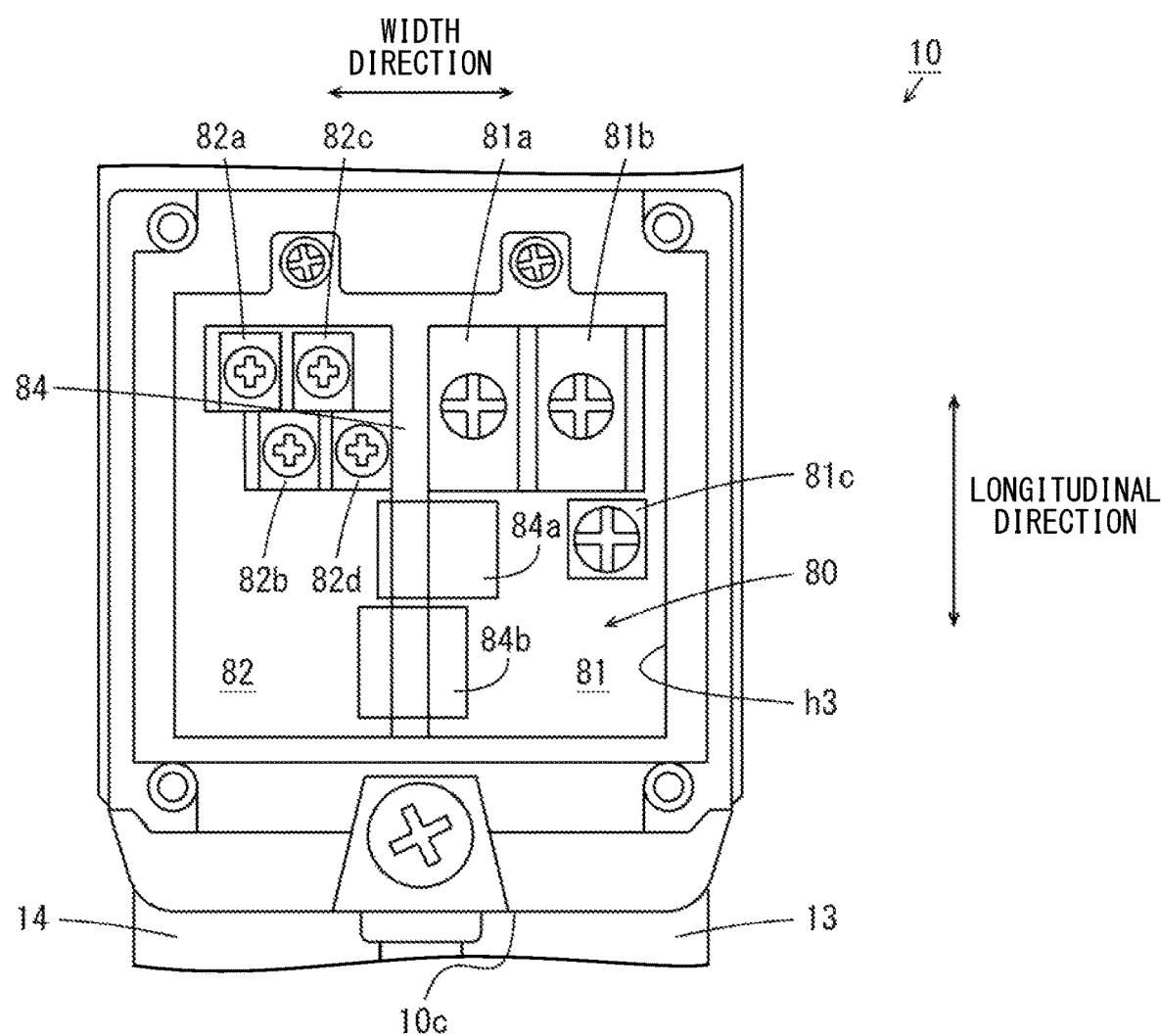
FIG. 12 is a plan view showing a configuration of a terminal block in a casing.

FIG. 12 is a plan view showing the configuration of the terminal block 80 in the casing 10. As shown in FIG. 12, the terminal block 80 is formed of an insulating material such as resin and has terminal mounting areas 81, 82 aligned widthwise. The terminal mounting areas 81, 82 are disposed so as to be respectively aligned with the ports 13, 14 along the longitudinal direction.

In the terminal mounting area 81, terminals 81a, 81b, 81c formed of a metallic material such as copper are provided. The terminals 81a, 81b are connected to the voltage input part on the power supply board 60 of FIG. 2. The terminal 81c is connected to the reference potential of the power supply board 60.

The cable 3 of FIG. 3 includes a plurality of electric wires connected to a live terminal, a neutral terminal and a ground terminal of the external power supply 200 of FIG. 4, respectively. The tips of these electric wires are inserted through the port 13 from the end face 10c of the casing 10 to the inside and are electrically connected to the terminals 81a to 81c, respectively.

In the terminal mounting area 82, terminals 82a, 82b, 82c, 82d formed of a metallic material such as copper are provided. The terminals 82a to 82d are connected to the signal output part 51E of FIG. 4. The terminal 82a constitutes a first control channel, and the terminal 82c constitutes a second control channel. A switching signal is output from each control channel.

The cable 4 of FIG. 3 includes a pair of electric wires each connected to the first and second input/output channels of the external device 300 of FIG. 4, and includes the other pair of electric wires connected to a positive potential and a reference potential of an external control power supply. The tips of the pair of electric wires are inserted through the port 14 from the end face 10c of the casing 10 to the inside, and are electrically connected to the terminals 82a, 82b, respectively. Similarly, the other pair of electric wires are inserted through the port 14 from the end face 10c of the casing 10 to the inside and electrically connected to the terminals 82c, 82d, respectively.

In this embodiment, it is possible to select the output method for the switching signal by an NPN method and a PNP method. In the NPN method, the reference potential of the external device 300 is maintained so as to be equal to the positive potential of the control power supply (the potential of the terminal 82b). In the PNP method, the reference potential of the external device 300 is maintained so as to be equal to the reference potential of the control power supply (the potential of the terminal 82d).

According to this wiring connection, for example, an AC voltage of 100 V to 240 V supplied from the external power supply 200 is input into the power supply board 60 of FIG. 2 through the cable 3 and the terminals 81a to 81c of the terminal block 80. In the power supply board 60, the input AC voltage is converted into a DC voltage of, for example, less than 36 V. The DC voltage converted by the power supply board 60 is output to the control board 50 and the display board 70 of FIG. 2. As a result, the flow meter 100 operates.

The switching signal output from the signal output part 51E of FIG. 4 is input into the first input/output channel of the external device 300 through the terminal 82a (first control channel) of the terminal block 80 and the cable 4. Similarly, the switching signal output from the signal output part 51E is input into the second input/output channel of the external device 300 through the terminal 82c (second control channel) of the terminal block 80 and the cable 4. Hence it is possible to switch between the on-state and the off-state of the external device 300 corresponding to each input/output channel based on the flow rate of the fluid flowing in the pipe P.

Further, the external device 300 can output an instruction signal for giving various instructions to the flow meter 100 from the second input/output channel. In this case, the instruction signal output from the second input/output channel of the external device 300 is given to the control board 50 through the cable 4 and the terminal 82c (second control channel) of the terminal block 80.

Between the terminal mounting area 81 and the terminal mounting area 82 and between each of the terminals 81a, 81b, and 82a to 82d are electrically isolated from each other by the partition member 84 so as to be non-short-circuited. In the present embodiment, the terminal 82a and the terminal 82c are aligned so as to be aligned widthwise. Further, the terminal 82b and the terminal 82d are aligned widthwise at positions slightly lower than those of the terminals 82a, 82c at the positions displaced in the longitudinal direction from the terminals 82a, 82c. It is thus possible to easily prevent the interference of the electric wires in the wiring connection.

A part of the partition member 84 positioned between the terminal mounting area 81 and the terminal mounting area 82 includes closing members 84a, 84b. The user can expose the structure formed in the terminal block 80 by holding the upwardly projecting partition wall portions of each of the closing members 84a, 84b and pulling those portions upward so as to remove the closing members 84a, 84b from the terminal block 80.

Figure 13:
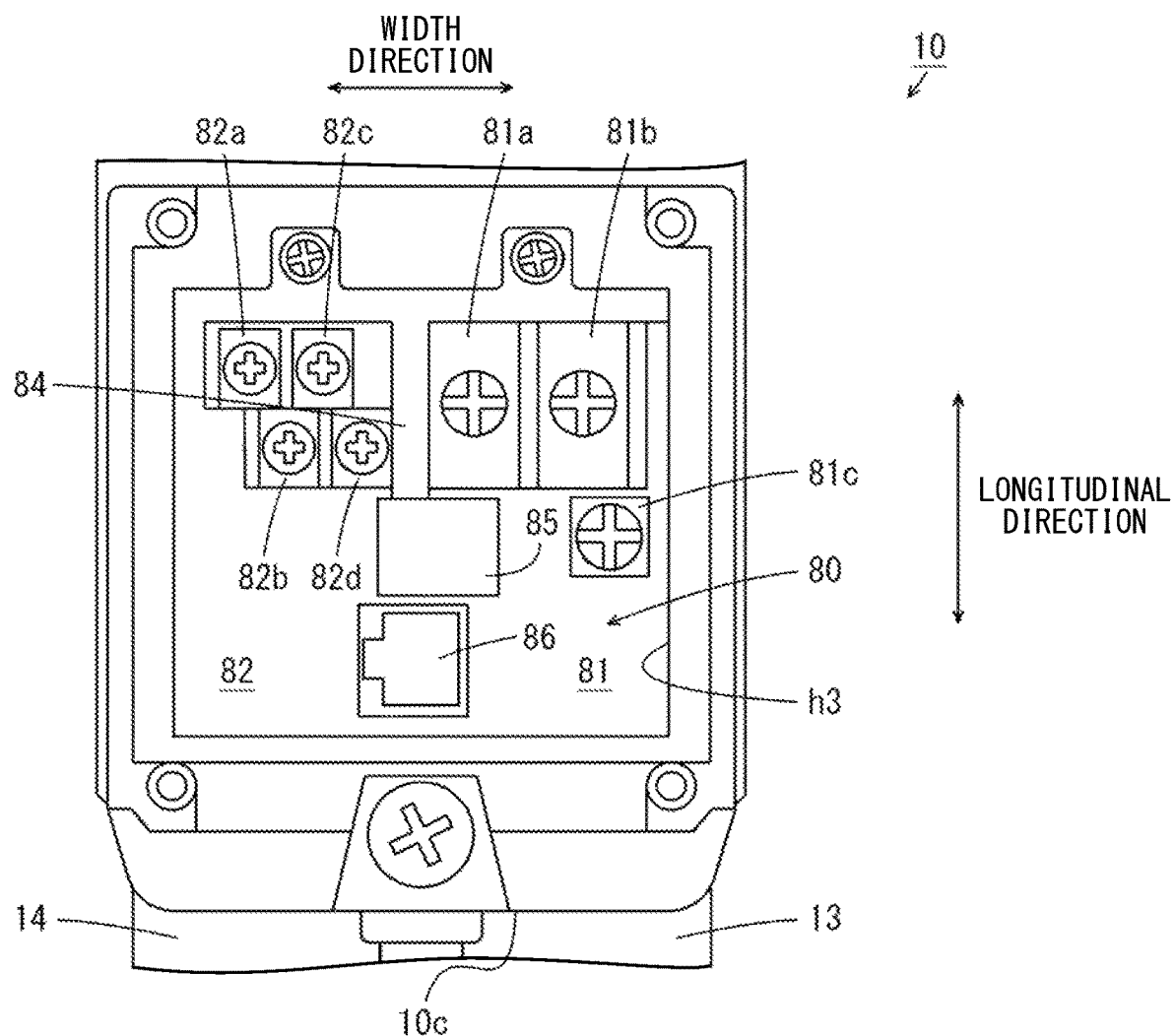
FIG. 13 is a plan view showing a terminal block in a state where a closing member has been removed.

FIG. 13 is a plan view showing the terminal block 80 in a state in which the closing members 84a, 84b are removed. As shown in FIG. 13, as the closing member 84a of FIG. 12 is detached from the terminal block 80, the battery accommodating portion 85 for housing the secondary battery 104 of FIG. 4 formed on the terminal block 80 is exposed.

In the present embodiment, the secondary battery 104 can be mounted on the closing member 84a. When the secondary battery 104 is mounted, the closing member 84a is fitted into the battery accommodating portion 85, whereby the secondary battery 104 is accommodated in the battery accommodating portion 85 and the battery accommodating portion 85 is closed. The secondary battery 104 is charged by the external power supply 200 of FIG. 4 in the battery accommodating portion 85 and supplies power to the time measurement part 103 of FIG. 4. In the present embodiment, it is unnecessary to frequently replace the secondary battery 104, so that the maintainability of the flow meter can be improved.

By removing the closing member 84b of FIG. 12 from the terminal block 80, the output terminal 86 formed on the terminal block 80 is exposed. By inserting a predetermined communication cable (RS 232C cable in the present example) connected to the management device 400 of FIG. 4 into the output terminal 86, the user can output the log data recorded in the log storage part 53 of FIG. 4 to the management device 400 and save the output data. The user can easily perform the connection work and the log data output work from above the casing 10 through the opening h3.

(7) Control Processing of Flow Meter

Figure 14:
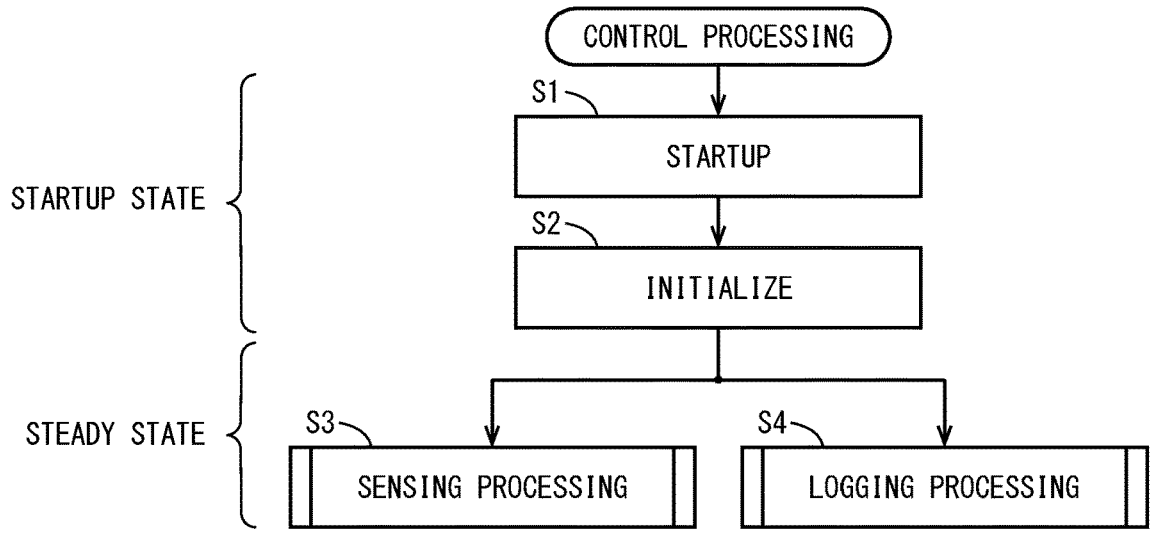
FIG. 14 is a flowchart showing an algorithm of control processing of a flow meter executed by a control program.

FIG. 14 is a flowchart showing the algorithm of the control processing of the flow meter 100 executed by the control program. As shown in FIG. 14, the control processing includes the startup processing executed in a startup state, and the sensing processing and the logging processing executed in a steady state. Hereinafter, the control processing of the flow meter 100 will be described mainly with reference to FIG. 4.

In the startup processing in the startup state, the microcomputer 51 is started up in response to turning on the power supply (Step S1). Next, the control part 51A (or the microcomputer 51) initializes the operation state of the flow meter 100 (Step S2). As a result, the inner diameter of the pipe P, the thresholds and the like stored in the log storage part 53 are read. These inner diameters and thresholds are information set by the setting part 51C and stored in the log storage part 53 during the previous operation of the flow meter 100. Further, in the present example, the first operation mode is set as the operation mode of the control part 51A. Moreover, the control part 51A reads the control program stored in the control storage part 52. The logging targets such as the maximum flow rate, the minimum flow rate and the integrated flow rate are previously incorporated into this control program. Thereafter, the startup state ends, and the flow meter 100 comes into the steady state. In the steady state, the sensing processing and the logging processing are executed in parallel and independently (Steps S3 and S4).

Figure 15:
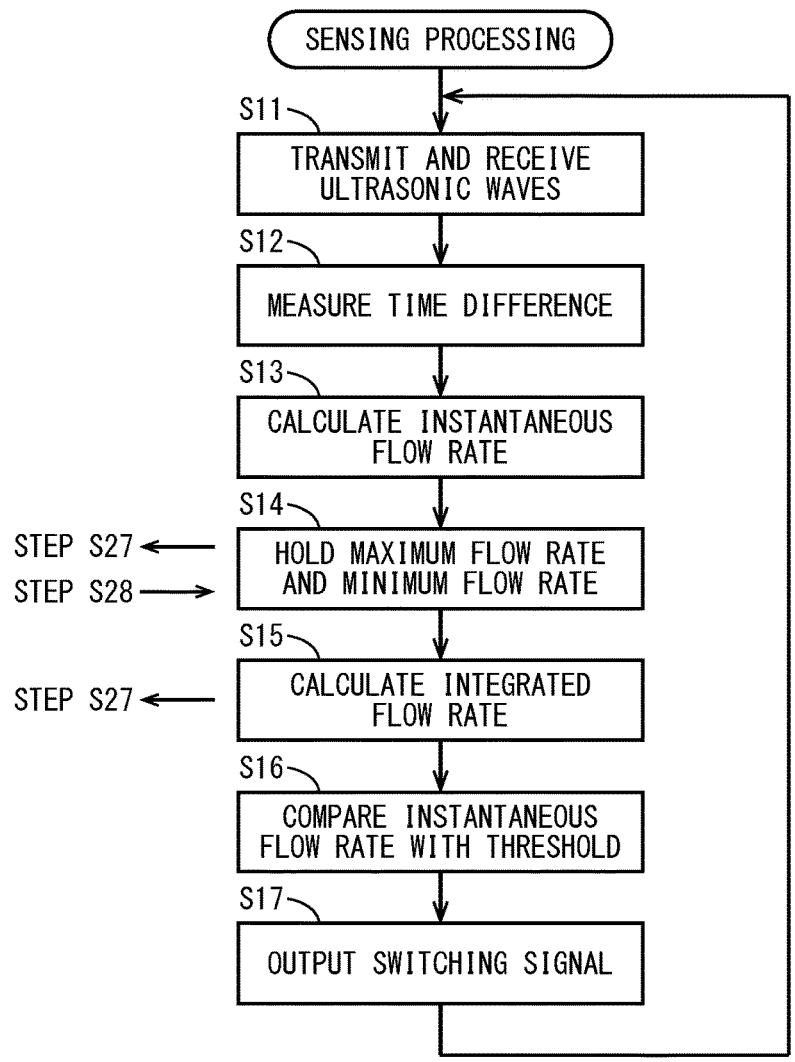
FIG. 15 is a flowchart showing an algorithm of sensing processing in Step S3 of FIG. 14.

FIG. 15 is a flowchart showing the algorithm of the sensing processing in Step S3 of FIG. 14. In the sensing processing, first, the measurement part 51B causes the detection elements 31, 41 to transmit and receive ultrasonic waves (Step S11). Next, the measurement part 51B measures the time difference based on the output signals from the detection elements 31, 41 (Step S12).

The calculation part 51D calculates the instantaneous flow rate based on the time difference measured in Step S12 and the inner diameter of the pipe P set in Step S2 (Step S13). Among the instantaneous flow rates calculated in Step S13, the control part 51A holds the instantaneous flow rate larger than the previous maximum instantaneous flow rate and the instantaneous flow rate smaller than the previous minimum instantaneous flow rate as the maximum flow rate and the minimum flow rate, respectively (Step S14).

The calculation part 51D calculates the integrated flow rate by integrating the instantaneous flow rate calculated in Step S13 (Step S15). The signal output part 51E compares the instantaneous flow rate calculated in Step S13 with the threshold set in Step S2 (Step S16). Thereafter, the signal output part 51E outputs a switching signal based on the comparison result of Step S16 (Step S17), and the processing is returned to Step S11. In the sensing processing, Steps S11 to S17 described above are repeated.

Figure 16:
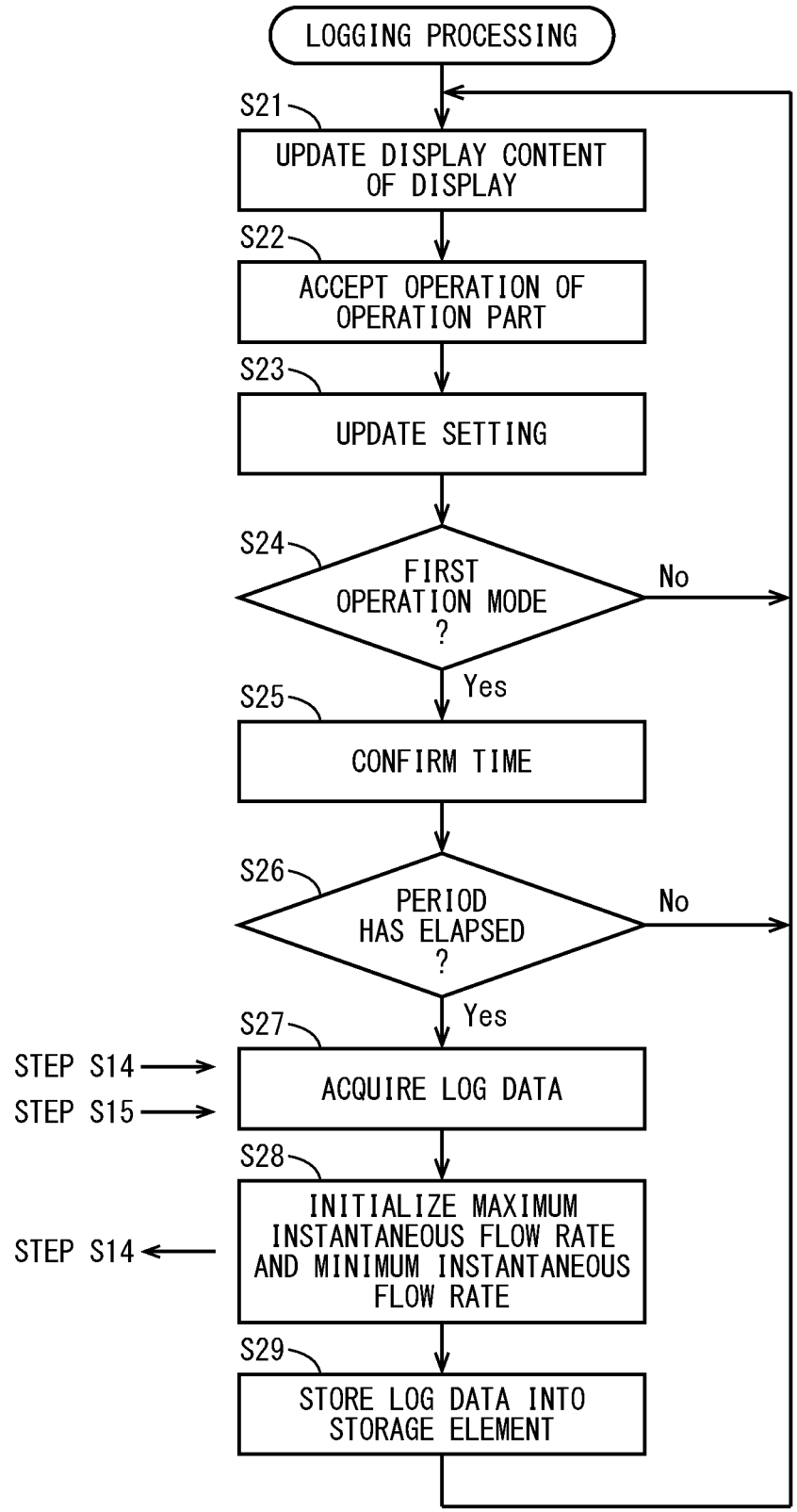
FIG. 16 is a flowchart showing an algorithm of logging processing in Step S4 of FIG. 14.

FIG. 16 is a flowchart showing the algorithm of the logging processing in Step S4 of FIG. 14. In the present embodiment, as described above, the control part 51A reads from the control storage part 52 the control program with the logging target, the logging cycle, and the logging start definition information incorporated thereinto and executes the read program, so that the logging processing is automatically started in parallel with and independently of the sensing processing.

In the logging processing, first, the display control part 51I updates the display content of the display 71 (Step S21). As a result, the display screen of FIG. 9 to FIG. 11 or the like is displayed on the display 71 based on the setting of the setting part 51C. Further, the setting part 51C accepts the operation of the operation parts 18 (Step S22). Thereafter, the setting part 51C updates the setting based on the operation accepted in Step S22 (Step S23).

Here, the control part 51A determines whether or not the first operation mode is selected in the setting after updating in Step S23 (Step S24). When the first operation mode is not selected, namely, when the second operation mode is selected, the control part 51A returns to Step S21. When the first operation mode is selected, the control part 51A confirms the time based on the time acquired by the time acquisition part 51H (Step S25).

Next, the control part 51A determines whether or not a predetermined period has elapsed (Step S26). When the period has not elapsed, the control part 51A returns the processing to Step S21. When the period has elapsed, the control part 51A acquires the set of the maximum flow rate and the minimum flow rate held in Step S14 and the integrated flow rate calculated in Step S15 as log data (Step S27).

Thereafter, the control part 51A initializes by updating the maximum instantaneous flow rate and the minimum instantaneous flow rate in Step S14 to the latest instantaneous flow rate (Step S28). Further, the control part 51A causes the log storage part 53 to store the log data acquired in Step S27 (Step S29) and returns the processing to Step S21. In the logging processing, Steps S21 to S29 described above are repeated.

In the above control processing, some of the processing may be executed at other points in time. For example, in the sensing processing of FIG. 15, either Step S14, Step S15 or Steps S16, S17 may be executed first or simultaneously. In the logging processing of FIG. 16, either Step S21 and Steps S22, S23 may be executed first. Any one of Step S28 and Step S29 may be executed first or Steps S28, S29 may be executed at the same time.

In the above control processing, when a combination of the maximum temperature and the minimum temperature is set as the log data, the temperature acquisition part 51G acquires the instantaneous temperature from the temperature measurement part 102 in parallel with Steps S11 to S13. In Step S14, among the acquired instantaneous temperatures, the control part 51A holds the instantaneous temperature higher than the previous maximum instantaneous temperature as the maximum temperature, and holds the instantaneous temperature lower than the previous minimum instantaneous temperature as the minimum instantaneous temperature.

Thereafter, in Step S27, the control part 51A acquires a set of the held maximum temperature and minimum temperature as log data. In Step S28, the control part 51A initializes the maximum instantaneous temperature and the minimum instantaneous temperature by updating those temperatures to the latest instantaneous temperatures.

In the above control processing, when the event history is set as the log data, the control part 51A holds the state of the switching signal output in Step S17. Thereafter, when a change in state of the held switching signal occurs in Step S27, the control part 51A acquires the content of the event as the log data.

(8) Effect

In the flow meter 100 according to the present embodiment, in response to reception of power from the external power supply 200, the control part 51A initializes the operation states of the detection elements 31, 41. After the initialization, ultrasonic waves are transmitted and received to and from the fluid flowing in the pipe P by the detection elements 31, 41, and the calculation part 51D calculates the instantaneous flow rate and integrated flow rate of the fluid in the pipe P. Further, the temperature acquisition part 51G acquires the temperature measured by the temperature measurement part 102, and the time acquisition part 51H acquires the time measured by the time measurement part 103. Then, the calculated instantaneous flow rate is displayed on the display 71 in real time. In this manner, the sensing processing is performed as the steady state of the flow meter 100.

On the other hand, the logging processing for logging a predetermined logging target is performed in parallel with and independently of this sensing processing. Specifically, the control part 51A reads and executes the control program stored in the control storage part 52. The control program includes a logging target, a logging cycle, and logging start definition information.

Therefore, the control part 51A causes the log storage part 53 to automatically store the time measured by the time measurement part 103 and the maximum flow rate and the minimum flow rate calculated by the calculation part 51D as log data in every predetermined logging cycle. The log data may include a part or the whole of the integrated flow rate calculated by the calculation part 51D, the maximum temperature and the minimum temperature acquired by the temperature acquisition part 51G, and the event history in the signal output part 51E.

With this configuration, in order to store the log data in the log storage part 53, there is no need for the user to perform a separate setting (operation). In particular, the logging start definition information for starting the logging at a specific time every five minutes after ending of the start-up processing of the flow meter 100 is included in the control program, so that the logging processing is started automatically. Therefore, it is guaranteed that the log data is always stored in the log storage part 53 after starting the flow meter 100. It is thus possible to log data more reliably. As a result, the user can easily manage the usage of the fluid based on the log data.

Further, in the above configuration, inappropriate information before initialization of the operation states of the detection elements 31, 41 is prevented from being stored into the log storage part 53 as log data. Moreover, when the user finds abnormality in the flow rate, temperature, event, or the like in a specific period, the user can easily confirm other information in the period. As a result, it is possible to easily and simply analyze a cause when abnormality occurs.

(9) Other Embodiments (a) In the above embodiment, the calculation part 51D calculates the flow rate of the fluid flowing in the pipe P by Expression (1) based on the propagation time difference method, but the present invention is not limited thereto. The calculation part 51D may calculate the flow rate of the fluid flowing in the pipe P based on the Doppler method. In this case, one of the detection elements 31, 41 may be made up of an ultrasonic transmission element, and the other one of the detection elements 31, 41 is made up of an ultrasonic reception element.

(b) In the above embodiment, the main units 30, 40 are provided in a so-called Z-type arrangement, but the present invention is not limited thereto. In a case where the pipe P is relatively small, the main units 30, 40 may be provided in an arrangement (so-called V-type arrangement) aligned in the direction in which the pipe P extends. In this configuration, the main unit 40 may be provided not in the casing 20 but in the casing 10.

In the V-type arrangement, the ultrasonic waves transmitted by the detection element 31 are incident on the fluid in the pipe P at the incident angle θ through the path member 32 and the acoustic couplant 33. The ultrasonic waves having passed through the fluid are reflected by the inner surface of the pipe P at a reflection angle θ and received by the detection element 41 through the acoustic couplant 43 and the path member 42. Similarly, the ultrasonic waves transmitted by the detection element 41 are incident on the fluid in the pipe P at an incident angle θ through the path member 42 and the acoustic couplant 43. The ultrasonic waves having passed through the fluid are reflected by the inner surface of the pipe P at the reflection angle θ and received by the detection element 31 through the acoustic couplant 33 and the path member 32.

(c) In the above embodiment, the flow meter 100 includes the casing 20, but the present invention is not limited thereto. When the main units 30, 40 are provided in the V-shaped arrangement described above, the flow meter 100 does not need to include the casing 20. Further, when a main unit having the same function as that of the main unit 40 is separately provided, the flow meter 100 does not need to include the casing 20 or the main unit 40.

(d) In the above embodiment, the flow meter 100 is an ultrasonic flow meter that measures the ultrasonic waves and calculates the flow rate of the fluid, but the present invention is not limited thereto. The flow meter 100 may be an electromagnetic flow meter that measures the electromotive force of the electrically conductive fluid to calculate the flow rate of the fluid or may be a vortex flow meter that measures the flow rate of the fluid by measuring the Karman vortex generated by the fluid flow.

Alternatively, the flow meter 100 may be an impeller type flow meter that detects the magnetism generated by the fluid flow with an element provided at the tip of the impeller to calculate the flow rate of the fluid, or may be a thermal type flow meter that heats the fluid and detects a temperature distribution of the heated fluid to calculate the flow rate of the fluid.

(e) In the above embodiment, the maximum flow rate and the minimum flow rate within the predetermined period are stored in the log storage part 53 as log data, but the present invention is not limited to this. The instantaneous flow rate at each time within a predetermined period may be stored into the log storage part 53 as log data.

Similarly, the maximum temperature and the minimum temperature within a predetermined period are stored into the log storage part 53 as log data, but the present invention is not limited to this. Instantaneous temperatures at respective times within a predetermined period may be stored into the log storage part 53 as log data. Alternatively, a representative temperature (e.g., average temperature) within a predetermined period may be stored into the log storage part 53 as log data.

(f) In the above embodiment, the time measurement part 103 is a real-time clock that measures time independently of turning-on of the power supply, but the present invention is not limited thereto. The time measurement part 103 may be a count-up timer for measuring the time from the operation start time of the flow meter 100. In this case, the time measurement part 103 may operate by turning on the power supply, and the secondary battery 104 does not need to be provided in the flow meter 100.

(g) In the above embodiment, the flow meter 100 includes the display 71, but the present invention is not limited thereto. When the flow rate calculated by the flow meter 100 or the information based on the log data or the like can be displayed on the display device outside the flow meter 100, the flow meter 100 does not need to include the display 71.

Figure 17:
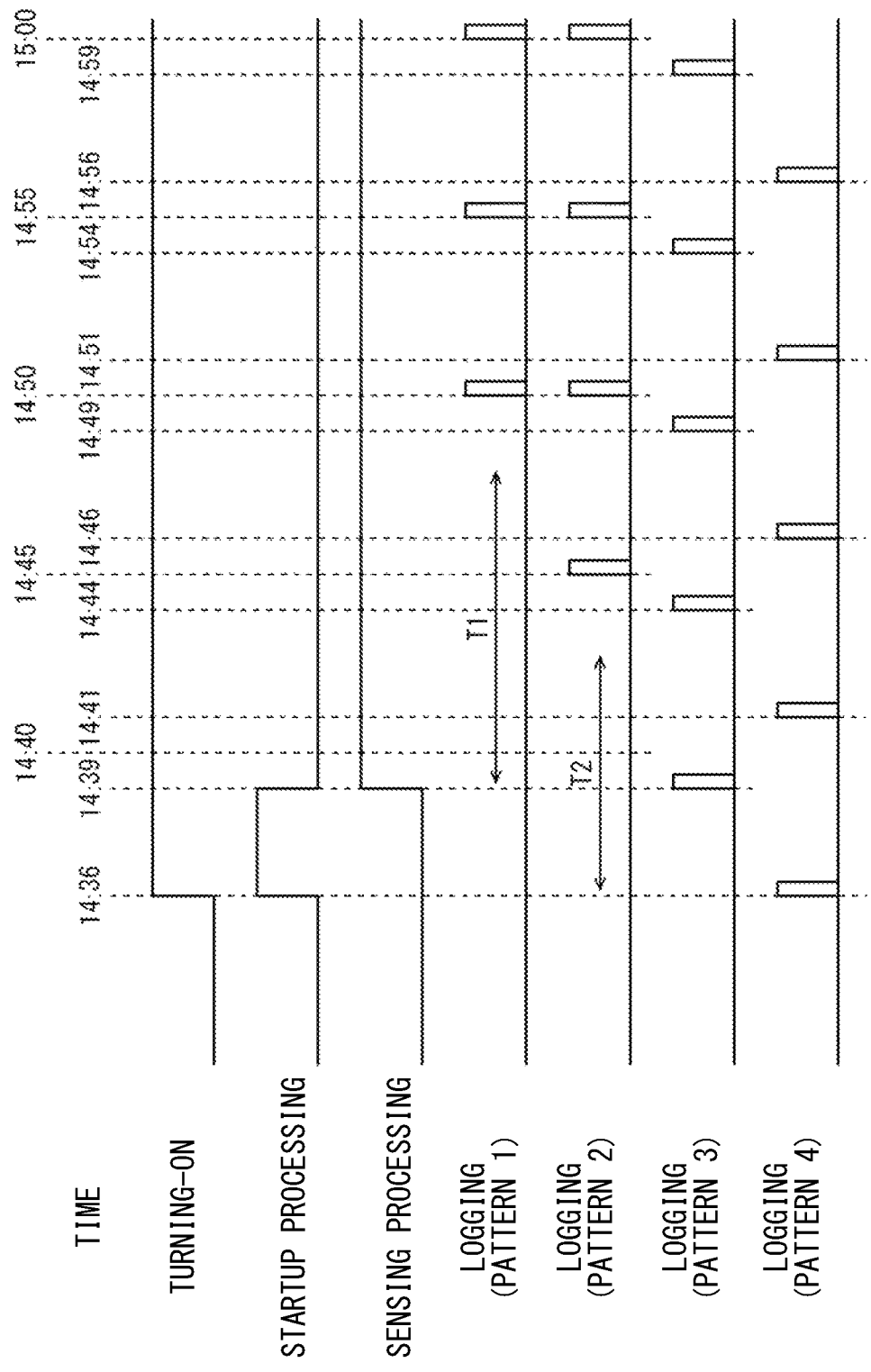
FIG. 17 is a view for explaining execution timing of logging based on logging start definition information in another embodiment.

(h) In the present embodiment, logging is started when the specific time comes every five minutes after ending of the start-up processing of the flow meter 100, by incorporating the logging start definition information into the control program, but the present invention is not limited thereto. FIG. 17 is a diagram for explaining execution timing of logging based on logging start definition information in another embodiment.

In the example of the pattern 1 of FIG. 17, a predetermined delay time T1 of five minutes to ten minutes both inclusive is provided after ending of the startup processing at 14:39. Thereafter, the logging is executed at 14:50 as a specific time. Also, the logging is repeated every five minutes, such as 14:55 and 15:00. In this case, the logging start definition information includes whether or not a specific time coming at regular time intervals has elapsed since ending of the startup processing and elapse of the predetermined delay time T1. This is determined by the control part 51A.

In the example of the pattern 2, after turning-on of the power supply at 14:36, a predetermined delay time T2 of five minutes and ten minutes both inclusive is provided. After that, the logging is executed at 14:45 as a specific time. The logging is repeated every five minutes, such as 14:50, 14:55 and 15:00. Pattern 2 may be used when the fluctuation of the time required for the startup processing is short. In this case, the logging start definition information includes whether or not a specific time coming at regular time intervals has elapsed since turning-on of the power supply and elapse of a predetermined delay time T2. This is determined by the control part 51A.

In the example of pattern 3, the startup processing ends at 14:39 and the logging is executed at the same time. Also, logging is repeated every five minutes such as 14:44, 14:49, 14:54, and 14:59. In this case, the logging start definition information includes whether or not the startup processing has ended. This is determined by the control part 51A.

In the example of pattern 4, the power supply is turned on at 14:36, and the logging is executed at the same time. The logging is repeated every five minutes, such as 14:41, 14:46, 14:51, and 14:56. In this case, the logging start definition information includes whether or not the power supply has been turned on. This is determined by the control part 51A. In Patterns 3 and 4, there is no need to measure the absolute time, so the time measurement part 103 does not need to include the real-time clock.

Here, as described above, in the pattern 3 shown in FIG. 17, whether or not the startup processing has ended is determined by the control part 51A, but the present invention is not limited thereto. For example, in the control program, the processing procedure of the logging processing may be associated with the processing procedure of the starting processing so that the logging processing is automatically started when the starting processing ends. In this case, the control part 51A does not determine whether or not the startup processing has ended, and the control program is merely executed. That is, the logging start definition information corresponds to (a part of) the execution program executed by the control part 51A.

Similarly, in the pattern 4 shown in FIG. 17, the control part 51A determines whether or not the power supply has been turned on, but the present invention is not limited thereto. For example, in the control program, the processing procedure of the logging processing may be associated with the processing procedure of power-on or the processing procedure to be executed first so that the logging processing is automatically started when power supply is turned on. In this case, the control part 51A does not determine whether or not the power supply has been turned on, and the control program is merely executed. That is, the logging start definition information corresponds to (a part of) the execution program executed by the control part 51A.

In this manner, the control part 51A automatically starts the logging target logging, based on the logging start definition information stored in the control storage part 52, regardless of whether or not to determine the start timing of the logging processing, and stores the measurement time and the numerical value of the logging target in association with each logging cycle in the log storage part 53.

(i) In the above embodiment, the instantaneous flow rate may be logged. Specifically, the control part 51A stores the instantaneous flow rate calculated by the calculation part 51D in, for example, a random access memory (RAM) every one second. Further, the control part 51A causes the log storage part 53 to store the average value (mL/min) per part time (e.g., one minute) of the instantaneous flow rate stored in the RAM in association with the time measured by the time measurement part 103. In this example, since the logging cycle is five minutes, five instantaneous flow rates are logged in each period.

With this configuration, the calculation part 51D can decide the maximum flow rate and the minimum flow rate in each period based on the instantaneous flow rate stored in the log storage part 53 and can calculate the integrated flow rate in each period. Further, the display 71 can display such information on the data display screen. Therefore, it is not necessary for the maximum flow rate and the minimum flow rate to be logged as logging targets, or the integrated flow rate does not need to be logged.

(10) Correspondence Relation Between Each Constituent Element of Claim and Each Part of Embodiment Hereinafter, an example of correspondence between each constituent element of the claims and each part of the embodiment will be described, but the present invention is not limited to the following example. As each constituent element of the claims, various other elements having the constitution or function described in the claims can be used.

In the above embodiment, the external power supply 200 is an example of a power supply, the flow meter 100 is an example of a flow meter, the pipe P is an example of a pipe, the detection elements 31, 41 are examples of a detection element, the calculation part 51D is an example of a flow rate calculation part. The control storage part 52 is an example of a control storage part, the log storage part 53 is an example of a log storage part and a ring buffer, and the time measurement part 103 is an example of a time measurement part and a real-time clock.

The control part 51A is an example of a control part, the display 71 is an example of a display, the operation parts 18 are an example of an operation part, a parameter selection part or a mode selection part, and the setting part 51C is an example of a setting part. The signal output part 51E is an example of the first and second signal output parts, the temperature measurement part 102 is an example of the temperature measurement part, the output terminal 86 is an example of the data output part, and the secondary battery 104 is an example of a secondary battery.

What is claimed is:

1. A flow meter configured to operate by receiving power from a power supply, the flow meter comprising:
    a detector configured to repeatedly detect a flow of a fluid flowing in a pipe in a predetermined sampling cycle and to generate an output signal;
    a control storage that stores a logging target to be logged, a logging cycle for the logging target, and logging start definition information for defining a start of logging of the logging target;
    a log storage that stores a numerical value of the logging target; and
    a processor coupled to the detector, the control storage and the log storage, and configured to:
        sequentially calculate a flow rate of the fluid in the pipe based on the output signal of the detector;
        acquire time during operation of the flow meter; and
        automatically start logging of the logging target including the calculated flow rate in the logging cycle in accordance with startup of the flow meter based on the logging start definition information stored in the control storage, and to cause the log storage to store as log data to be displayed, the time acquired and the numerical value of the logging target in association with each other.

2. The flow meter according to claim 1, wherein each of the logging target, the logging cycle, and the logging start definition information stored in the control storage is made up of a parameter not settable by a user, a default parameter decided before setting, or an execution program of the processor.

3. The flow meter according to claim 1, further comprising:
    a display that displays a current instantaneous flow rate calculated by the processor, wherein
    the control storage further stores display format information for identifiably displaying the logging target on the display, and
    the display simultaneously or switchably displays the instantaneous flow rate and the logging target based on the display format information stored in the control storage.

4. The flow meter according to claim 3, wherein the display is capable of selectively displaying the logging target stored in the log storage in every period corresponding to the logging cycle.

5. The flow meter according to claim 1, further comprising:
    an operation part that accepts an input based on a user's operation;
    a setting part that sets a flow rate threshold serving as a reference for comparison with the flow rate calculated by the processor based on the input accepted by the operation part;
    a first signal output part that outputs an on or off signal related to the flow rate based on the flow rate calculated by the processor and the flow rate threshold set by the setting part; and
    a display that displays the current instantaneous flow rate calculated by the processor,
    wherein the display simultaneously or switchably displays the instantaneous flow rate, the flow rate threshold, and the logging target.

6. The flow meter according to claim 1, comprising
    a display that displays a current instantaneous flow rate calculated by the processor, wherein
    the processor further determines a maximum flow rate and a minimum flow rate within a period corresponding to the logging cycle in every logging cycle from the sequentially calculated flow rate of the fluid in the pipe,
    the control storage further stores the maximum flow rate and the minimum flow rate as the logging targets,
    the processor causes the log storage to store the time acquired, the maximum flow rate, and the minimum flow rate in association with each other in every logging cycle, and
    the display simultaneously or switchably displays the instantaneous flow rate, the maximum flow rate, and the minimum flow rate.

7. The flow meter according to claim 1, comprising:
a display that displays a current instantaneous flow rate calculated by the processor, wherein
the control storage stores the instantaneous flow rate as the logging target,
the processor causes the log storage to store the time acquired and the instantaneous flow rate in association with each other in every logging cycle,
the processor further determines a maximum flow rate and a minimum flow rate within a period corresponding to the logging cycle in every logging cycle from the instantaneous flow rate stored in the log storage, and
the display simultaneously or switchably displays the instantaneous flow rate, the maximum flow rate, and the minimum flow rate.

8. The flow meter according to claim 1, comprising:
a display that displays a current instantaneous flow rate calculated by the processor, wherein
the processor further calculates an integrated flow rate from the sequentially calculated flow rate of the fluid in the pipe,
the control storage further stores the integrated flow rate as the logging target, and
the processor causes the log storage to store the time acquired and the integrated flow rate in association with each other in every logging cycle, and
the display simultaneously or switchably displays the instantaneous flow rate and the integrated flow rate.

9. The flow meter according to claim 1, comprising:
a display that displays a current instantaneous flow rate calculated by the processor, wherein
the control storage stores the instantaneous flow rate as the logging target,
the processor causes the log storage to store the time acquired and the instantaneous flow rate in association with each other in every logging cycle,
the processor further calculates an integrated flow rate from the instantaneous flow rate stored in the log storage, and
the display simultaneously or switchably displays the instantaneous flow rate and the integrated flow rate.

10. The flow meter according to claim 1, further comprising:
a temperature measurement part that measures a temperature of a fluid, wherein
the control storage further stores a representative temperature within a period corresponding to the logging cycle based on the temperature measured by the temperature measurement part as the logging target, and
the processor causes the log storage to store the time acquired and the representative temperature in association with each other in every logging cycle.

11. The flow meter according to claim 1, further comprising:
a second signal output part that outputs a binary signal based on the flow rate calculated by the processor, wherein
the control storage further stores a history of a change when the state of the binary signal output by the second signal output part changes within a period corresponding to the logging cycle, and
the processor causes the log storage to store the time acquired and the change history in association with each other in every logging cycle.

12. The flow meter according to claim 1, further comprising:
a parameter selection part that accepts selection of a parameter to be the logging target.

13. The flow meter according to claim 1, further comprising:
a data output part capable of outputting the logging target stored in the log storage.

14. The flow meter according to claim 1, wherein
the processor initializes an operation state of the detector in response to receiving power from the power supply, and
the processor operates after initialization.

15. The flow meter according to claim 1, wherein
the log storage includes a ring buffer, and
when a logging target is stored into all storage areas of the ring buffer, the processor overwrites the logging target stored last and stores the latest logging target.

16. The flow meter according to claim 1, wherein
the flow meter includes a real-time clock that operates independently of power supply from the power supply, and
the processor causes the log storage to store an absolute time based on the real-time clock and the logging target in association with each other.

17. The flow meter according to claim 16, further comprising:
a secondary battery that is charged with power from the power supply and supplies the power to the real-time clock.

18. The flow meter according to claim 1, further comprising:
a mode selection part that accepts selection of an operation mode to be executed by the processor out of a first operation mode in which the logging target is stored into the log storage and a second operation mode in which the logging target is not stored into the log storage.

19. The flow meter according to claim 1, wherein
the detector detects at least one of transmission of ultrasonic waves to the fluid flowing in the pipe and reception of ultrasonic waves from the fluid flowing in the pipe to detect the ultrasonic waves, and
the processor sequentially calculates the flow rate of the fluid in the pipe based on the ultrasonic waves detected by the detector.

* * * * *